(12) United States Patent
Ito et al.

(10) Patent No.: US 9,132,802 B2
(45) Date of Patent: Sep. 15, 2015

(54) SEATBELT DEVICE

(71) Applicant: Autoliv Development AB, Vårgårda (SE)

(72) Inventors: Katsuhiro Ito, Yokohama (JP); Yusuke Shinya, Yokohama (JP); Ganta Hibata, Yokohama (JP); Jin Hayashihara, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/356,983

(22) PCT Filed: Nov. 14, 2012

(86) PCT No.: PCT/JP2012/079499
§ 371 (c)(1),
(2) Date: May 8, 2014

(87) PCT Pub. No.: WO2013/073568
PCT Pub. Date: May 23, 2013

(65) Prior Publication Data
US 2014/0306508 A1    Oct. 16, 2014

(30) Foreign Application Priority Data

Nov. 14, 2011  (JP) ................ 2011-248981
Nov. 14, 2011  (JP) ................ 2011-248982
Dec. 14, 2011  (JP) ................ 2011-273694

(51) Int. Cl.
*B60R 22/36*    (2006.01)
*B60R 22/40*    (2006.01)
*B60R 22/26*    (2006.01)

(52) U.S. Cl.
CPC ............... *B60R 22/36* (2013.01); *B60R 22/40* (2013.01); *B60R 2022/263* (2013.01); *B60R 2022/403* (2013.01)

(58) Field of Classification Search
CPC ............................. B60R 2022/401–2022/403
USPC ................................. 280/806; 297/478, 480
See application file for complete search history.

(56) References Cited

U.S. PATENT DOCUMENTS

| | | | |
|---|---|---|---|
| 4,844,374 A * | 7/1989 | Mori | ............ 242/384.4 |
| 6,015,164 A | 1/2000 | Yano | |
| 6,068,340 A | 5/2000 | Yano et al. | |

(Continued)

FOREIGN PATENT DOCUMENTS

| | | |
|---|---|---|
| JP | H10-291461 A | 11/1998 |
| JP | H11-291865 A | 10/1999 |

(Continued)

OTHER PUBLICATIONS

Japanese Patent Office, International Search Report of PCT/JP2012/079499, Mailed on Jan. 15, 2013, 2 pages.

*Primary Examiner* — James English
(74) *Attorney, Agent, or Firm* — Brinks Gilson & Lione

(57) ABSTRACT

A deviation in rotational angle caused between an adjustment gear and a sensor housing is compensated for with a profile of a cable winding groove of a pulley of an attitude control mechanism to accurately synchronize the inclination angle of a seat back and the rotational angle of the sensor housing with each other. Thus, it is possible to keep an inertial element support surface, which serves as a sensor reference surface, accurately horizontal even at any seat back inclination angle to improve the accuracy of an acceleration sensor.

19 Claims, 16 Drawing Sheets

(56) References Cited

U.S. PATENT DOCUMENTS

| | | |
|---|---|---|
| 6,547,175 B2 | 4/2003 | Kielwein et al. |
| 2004/0251675 A1* | 12/2004 | Herberg et al. ............... 280/806 |
| 2008/0203806 A1* | 8/2008 | Hibata et al. .................. 297/478 |
| 2013/0161437 A1* | 6/2013 | Ono et al. ..................... 242/384 |

FOREIGN PATENT DOCUMENTS

| | | |
|---|---|---|
| JP | H11-326362 A | 11/1999 |
| JP | 2000-079867 A | 3/2000 |
| JP | 2007-237912 A | 9/2007 |
| WO | 2013/073568 A1 | 5/2013 |
| WO | 2013/073569 A1 | 5/2013 |

* cited by examiner

FIG. 1A
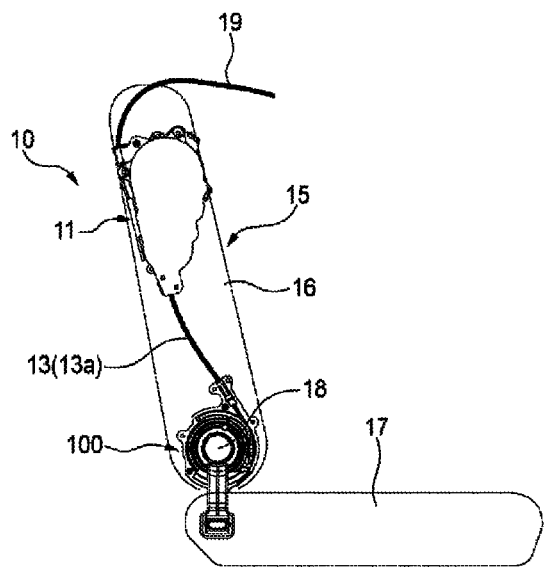
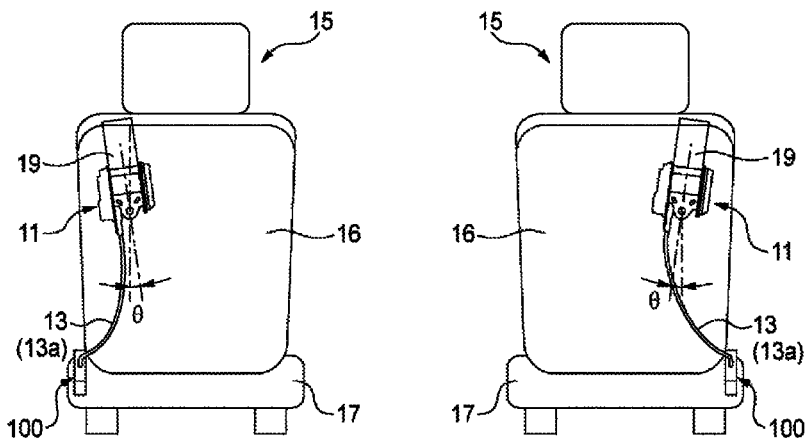
FIG. 1B
FIG. 1C

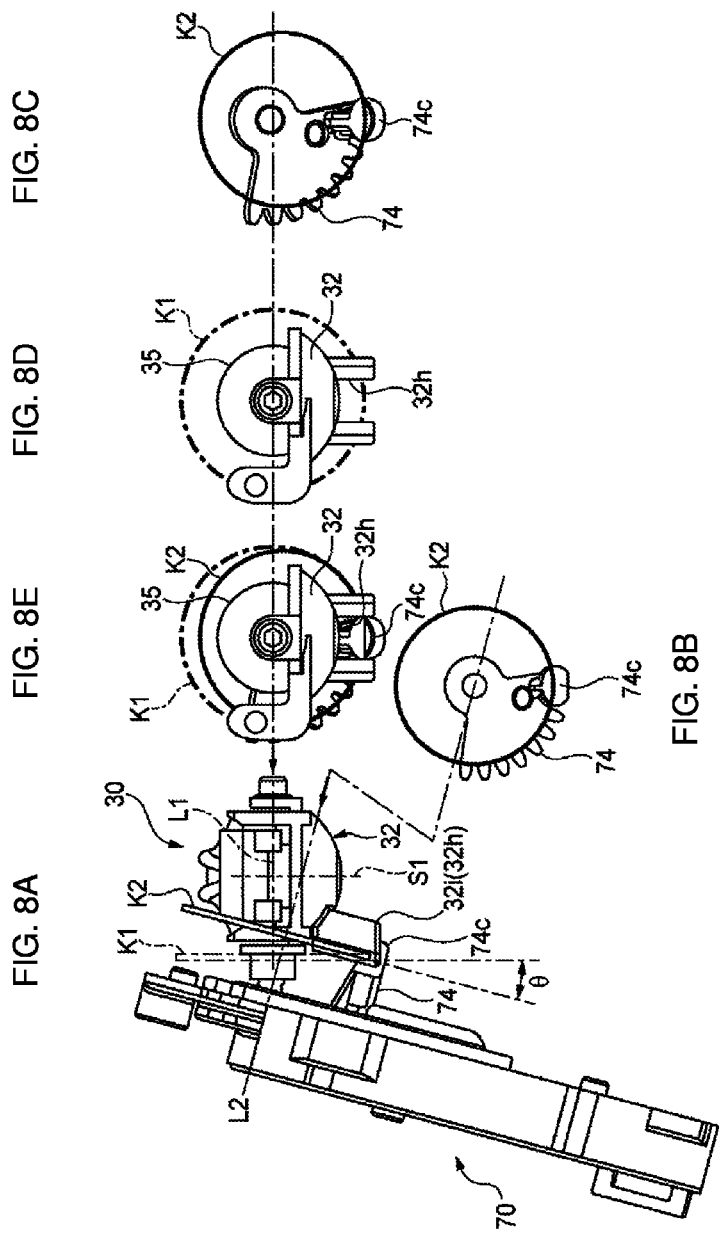

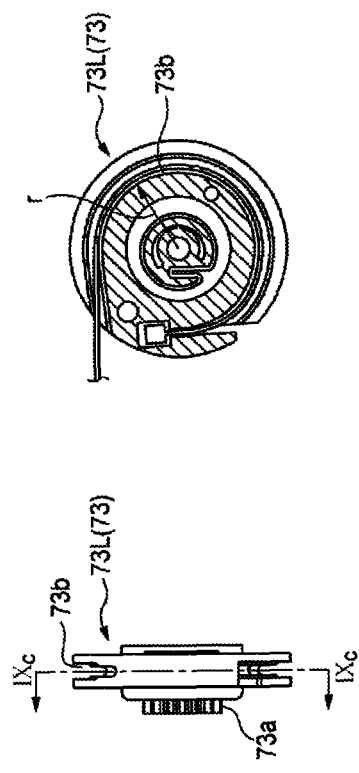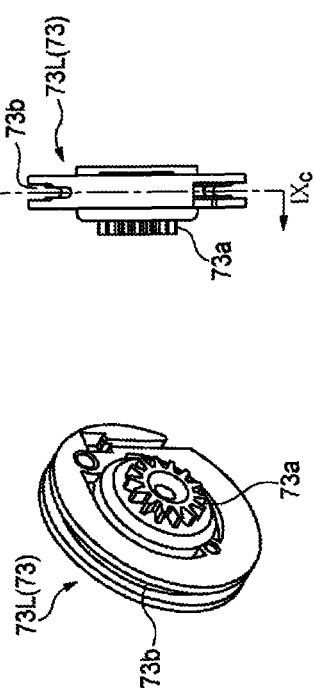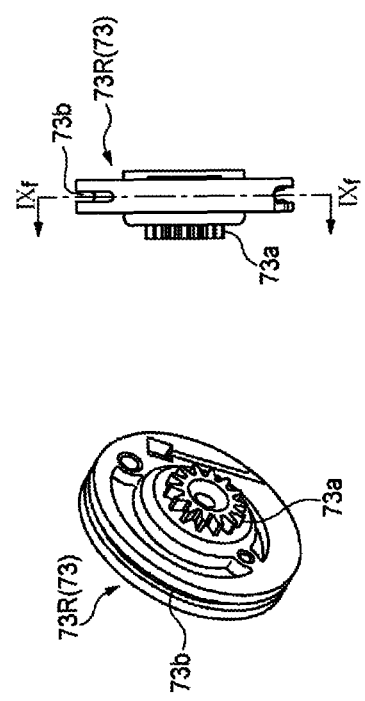

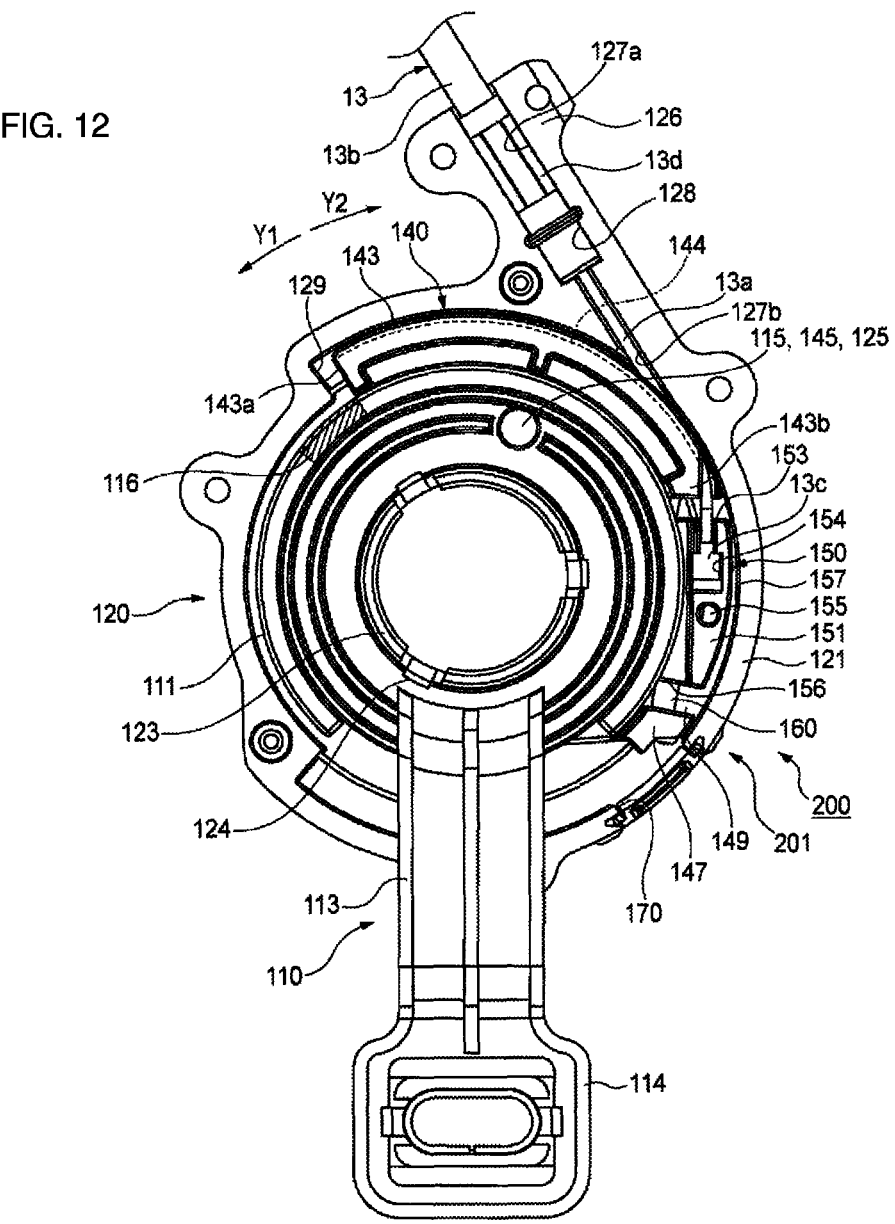

SEATBELT DEVICE

BACKGROUND OF THE INVENTION

1. Field of the Invention

The present invention relates to a seatbelt device configured to protect an occupant in a vehicle, and, more particularly, to a seatbelt device in which a seatbelt retractor is incorporated into a seat back of a reclining seat.

2. Description of the Related Art

A seatbelt device mounted on a vehicle is configured to protect an occupant seated on a seat when the vehicle crashes, or the like, by restraining the occupant with a seatbelt drawn out of a seatbelt retractor. The seatbelt retractor includes an acceleration sensor configured to detect acceleration that is larger than a predetermined value and applied in a horizontal direction when the vehicle crashes, or the like, and a lock mechanism for the seatbelt configured to prevent the seatbelt from being drawn out when the lock mechanism is actuated. Examples of an inertial element for use in the acceleration sensor include a ball and a self-standing inertial element.

In the case where a seatbelt retractor having an acceleration sensor of this type is provided in a seat back of a reclining seat, acceleration may not be detected adequately because the attitude of the seatbelt retractor is varied in accordance with the reclining angle (inclination angle) of the seat back. Thus, there are known seatbelt devices provided with an acceleration sensor capable of adequately detecting acceleration irrespective of the reclining angle of the seat back (see Japanese Patent Application Laid-open No. 2000-79867, Japanese Patent Application Laid-open No. 2000-52921, and Japanese Patent Application Laid-open No. H11-326362, for example).

In the seatbelt devices described in Japanese Patent Application Laid-open No. 2000-79867, Japanese Patent Application Laid-open No. 2000-52921, and Japanese Patent Application Laid-open No. H11-326362, a cable advancing/retracting mechanism, configured to advance and retract a cable by a length corresponding to the inclination angle of a seat back, is disposed at a coupling portion where a seat back support arm provided to project from a seat cushion and a reclining rotary shaft are coupled to each other. A sensor reference line of an acceleration sensor is controlled by a cable extending between the cable advancing/retracting mechanism and a seatbelt retractor such that the sensor reference line is always directed in the vertical direction to enable adequate detection of acceleration when the seat back is tilted forward or rearward.

The attachment angle of the seatbelt retractor to the seat back in the vehicle width direction (the left-right direction of the vehicle) is different in accordance with the vehicle model, the vehicle seat specifications, or the like in order to ensure that the seatbelt is drawn out smoothly. In a seatbelt device described in Japanese Patent Application Laid-open No. H11-326362, the attitude of an acceleration sensor is adjustable to the vertical direction in correspondence with variations in attachment angle not only in the front-back direction of the vehicle but also in the vehicle width direction.

SUMMARY OF THE INVENTION

The seatbelt devices described in Japanese Patent Application Laid-open No. 2000-79867 and Japanese Patent Application Laid-open No. 2000-52921 support variations in reclining angle of the seat back, that is, variations in attitude of the seatbelt retractor in the front-back direction of the vehicle, but do not support variations in attachment angle in the vehicle width direction.

In the seatbelt device described in Japanese Patent Application Laid-open No. 2002-2446, the rotational position of an inertial sensor is fixed by laser welding or joining to support variations in attachment angle in the vehicle width direction. However, Japanese Patent Application Laid-open No. 2002-2446 does not disclose a cable advancing/retracting mechanism at all. The rotational position of the inertial sensor is fixed at different angles in accordance with the seat specifications. Thus, a dedicated part matching the attachment angle of the seatbelt retractor is required for the attitude of the acceleration sensor to be always directed in the vertical direction. However, designing, manufacturing, and having in stock a large number of dedicated parts matching a large variety of specifications leads to a cost increase and is not favorable.

Examples of the cable advancing/retracting mechanism include a rack and pinion type in which a rack and a pinion are combined to convert rotation of the pinion, which is synchronized with tilting motion of the seat back, into advancing/retracting operation of a cable via the rack. The seatbelt device described in Japanese Patent Application Laid-open No. H11-326362 adopts a cable advancing/retracting mechanism of a direct type, in which a cable is directly wound around a cam member (which is referred to as a "slider" in Japanese Patent Application Laid-open No. H11-326362 and which is occasionally referred to as a "pulley"), and in which the length of the cable wound around the cam member is varied in accordance with relative rotation between the cam member and a casing member that is tiltable together with the seat back to advance and retract the cable.

Specifically, the direct-type cable advancing/retracting mechanism includes a casing member (which is referred to as a "case" in Japanese Patent Application Laid-open No. H11-326362) fixed to the seat back to be tiltable together with the seat back, a lever member (which is referred to as a "seating portion-side plate" in Japanese Patent Application Laid-open No. H11-326362) fixed to the seat cushion, and a cam member around which a terminal portion of the cable is wound and which is fixed at a fixed position by the lever member when the seat back is in a predetermined tilting range to rotate relative to the tiltable casing member. A terminal fixing portion of an exterior tube configured to slidably hold the cable is provided at a cable introduction portion of the casing member. A terminal portion of the cable drawn out of a terminal portion of the exterior tube and wound in a winding groove of the cam member is fixed to the cam member.

In order to linearly transfer the tilting angle of the seat back to the acceleration sensor via the cable, it is necessary to accommodate fluctuations in length of the cable through adjustment during assembly. Therefore, in the cable advancing/retracting mechanism discussed above, a cable length adjustment mechanism is provided at the terminal fixing portion of the exterior tube provided at the casing member. The cable length adjustment mechanism adjusts the length of the cable drawn out of the terminal portion of the exterior tube. That is, the length of a portion of the cable (inner cable), which is housed in the exterior tube, that is drawn out of the terminal of the exterior tube may be adjusted by changing the position of the terminal of the exterior tube fixed to the casing member through the cable length adjustment mechanism.

In the cable advancing/retracting mechanism of the seatbelt device according to the related art described in Japanese Patent Application Laid-open No. 2000-79867, the cable length is adjusted before the cam member, which actually detects the turning angle (that is, at the middle of the cable), because the cable length adjustment mechanism is provided at the casing member. Thus, there may remain slight slack in the cable between the cable length adjustment mechanism and the terminal portion of the cable. This may accordingly degrade the accuracy in detecting the turning angle, and reduce the accuracy in controlling the attitude of the acceleration sensor to lower the detection accuracy of the acceleration sensor. Since the cable length adjustment mechanism is provided at the casing member, which is an exterior part, the compactness of the outer shape of the cable advancing/retracting mechanism may be accordingly degraded.

The present invention has been made in view of the foregoing issues, and therefore has an object to provide a seatbelt device capable of keeping a sensor reference surface accurately horizontal even at any seat back inclination angle to improve the accuracy of an acceleration sensor.

In one aspect, the present invention provides a seatbelt device with the configuration described below.

A seatbelt retractor attached to a seat back of a reclining seat and configured to wind up a seatbelt when necessary; and a cable advancing/retracting mechanism disposed at a coupling portion at which the seat back and a seat cushion of the reclining seat are coupled to each other and configured to detect an inclination angle of the seat back when the seat back is tilted in a front-back direction of a vehicle, the cable advancing/retracting mechanism including a cable configured to transmit the tilting angle to the seatbelt retractor and advance and retract in a longitudinal direction of the cable over a distance corresponding to the inclination angle of the seat back, the seatbelt retractor including: a retractor frame fixed to the seat back as inclined in a left-right direction of the vehicle with respect to a line extending in an up-down direction at a center of the seat back in the left-right direction; a spindle supported by the retractor frame and configured to wind up the seatbelt; an acceleration sensor attached to the retractor frame to detect acceleration in the front-back direction of the vehicle; a lock mechanism configured to lock draw-out operation for the seatbelt in accordance with the acceleration in the front-back direction of the vehicle detected by the acceleration sensor; and an attitude control mechanism configured to keep a sensor reference surface of the acceleration sensor horizontal, the acceleration sensor including: a sensor cover fixed to the retractor frame; an inertial element configured to be moved in the front-back direction of the vehicle when acceleration that is equal to or more than a predetermined value is applied in the front-back direction of the vehicle; a sensor housing supported on the sensor cover and having a swing axis extending along the left-right direction of the vehicle and an inertial element support surface on which the inertial element is placed; and an actuation member configured to actuate the lock mechanism to lock the draw-out operation in conjunction with movement of the inertial element in the front-back direction of the vehicle, and the attitude control mechanism including: a rotary member configured to be turned by an angle corresponding to a distance over which the cable is advanced or retracted by the cable advancing/retracting mechanism; and a rotation transfer mechanism configured to transfer rotation of the rotary member to the sensor housing to swing the sensor housing in the front-back direction of the vehicle, wherein a turning axis of the rotary member and the swing axis of the sensor housing intersect each other at a predetermined angle with respect to the left-right direction of the vehicle with the swing axis of the sensor housing arranged in a horizontal direction with respect to the left-right direction of the vehicle, the inertial element support surface of the sensor housing is kept horizontal by swing motion of the sensor housing in the front-back direction of the vehicle even if the seat back is tilted in the front-back direction of the vehicle, a rotational track surface of the rotary member and a rotational track surface of the sensor housing are non-parallel with each other, and a compensation unit is provided between the cable advancing/retracting mechanism and the attitude control mechanism, the compensation unit being configured to compensate for a deviation in rotational angle caused by such non-parallelism between the two rotational track surfaces when the rotation transfer mechanism transmits rotation from the rotary member to the sensor housing.

In another aspect, the seatbelt device has an attitude control mechanism includes a pulley configured to convert advancing and retracting motion of the cable into rotational motion to transmit rotation to the rotary member, and a winding radius of the cable is set so as to be varied in accordance with a rotational angle of the pulley by forming a cable winding portion of the pulley in a spline curve shape, and the compensation unit is constituted by the cable winding portion of the pulley formed in the spline curve shape.

In a further aspect, the cable advancing/retracting mechanism includes a cam member configured to allow the cable to be wound and pulled out in accordance with rotation to advance and retract the cable over a distance corresponding to the inclination angle of the seat back, and a winding radius of the cable is set so as to be varied in accordance with a rotational angle of the cam member by forming a cable winding portion of the cam member in a spline curve shape, and the compensation unit is constituted by the cable winding portion of the cam member formed in the spline curve shape.

In an additional aspect, the rotation transfer mechanism includes a pin and a slit provided on the rotary member and in the sensor housing, respectively, and disposed at positions away from the swing axis and the turning axis in a radial direction to be engaged with each other.

In another aspect, the seatbelt retractor is attached to a seat back of a reclining seat and configured to wind up a seatbelt when necessary; and a cable advancing/retracting mechanism disposed at a coupling portion at which the seat back and a seat cushion of the reclining seat are coupled to each other and configured to detect an inclination angle of the seat back when the seat back is tilted in a front-back direction of a vehicle, the cable advancing/retracting mechanism including a cable configured to transmit the tilting angle to the seatbelt retractor and advance and retract in a longitudinal direction of the cable over a distance corresponding to the inclination angle of the seat back, the seatbelt retractor including: a retractor frame fixed to the seat back as inclined in a left-right direction of the vehicle with respect to a line extending in an up-down direction at a center of the seat back in the left-right direction; a spindle supported by the retractor frame and configured to wind up the seatbelt; an acceleration sensor attached to the retractor frame to detect acceleration in the front-back direction of the vehicle; a lock mechanism configured to lock draw-out operation for the seatbelt in accordance with the acceleration in the front-back direction of the vehicle detected by the acceleration sensor; and an attitude control mechanism configured to keep a sensor reference surface of the acceleration sensor horizontal, and the acceleration sensor including: a sensor cover fixed to the retractor frame; an inertial element configured to be moved in the front-back direction of the vehicle when acceleration that is equal to or more than a predetermined value is applied in the front-back direction of the vehicle; a sensor housing supported on the sensor cover and having a swing axis extending along the left-right direction of the vehicle and an inertial element support surface on which the inertial element is placed; and an actuation member configured to actuate the lock mechanism to lock the draw-out operation in conjunction with movement of the inertial element in the front-back direction of the vehicle, in which the attitude control mechanism includes a pulley configured to convert advancing and retracting motion of the cable of the cable advancing/retracting mechanism into rotational motion, and a rotational track surface of the pulley and a rotational track surface of the sensor housing are non-parallel with each other, and a compensation unit is provided between the cable advancing/retracting mechanism and the attitude control mechanism, the compensation unit being configured to compensate for a deviation in rotational angle caused by such non-parallelism between the two rotational track surfaces when rotation is transmitted from the pulley to the sensor housing.

In yet a further aspect, a winding radius of the cable is set so as to be varied in accordance with a rotational angle of the pulley by forming a cable winding portion of the pulley in a spline curve shape, and the compensation unit is constituted by the cable winding portion of the pulley formed in the spline curve shape.

In still another aspect, the cable advancing/retracting mechanism includes a cam member configured to allow the cable to be wound and pulled out in accordance with rotation to advance and retract the cable over a distance corresponding to the inclination angle of the seat back, and a winding radius of the cable is set so as to be varied in accordance with a rotational angle of the cam member by forming a cable winding portion of the cam member in a spline curve shape, and the compensation unit is constituted by the cable winding portion of the cam member formed in the spline curve shape.

In yet another aspect, the attitude control mechanism further includes a rotary member configured to be turned by an angle corresponding to a distance over which the cable is advanced or retracted by the cable advancing/retracting mechanism in synchronization with rotation of the pulley, and a rotation transfer mechanism configured to transfer rotation of the rotary member to the sensor housing to swing the sensor housing in the front-back direction of the vehicle, the sensor cover is provided separately from the attitude control mechanism, and the sensor cover is formed such that a turning axis of the rotary member and the swing axis of the sensor housing intersect each other at a predetermined angle with respect to the left-right direction of the vehicle with the swing axis of the sensor housing arranged in a horizontal direction with respect to the left-right direction of the vehicle.

In an additional aspect, the rotation transfer mechanism includes a pin and a slit provided on the rotary member and in the sensor housing, respectively, and disposed at positions away from the swing axis and the turning axis in a radial direction to be engaged with each other.

In still a further aspect, the cable advancing/retracting mechanism includes a lever member fixed to the seat cushion, a casing member disposed coaxially with a center of turning motion of the seat back so as to be turnable with respect to the lever member, the casing member being fixed to the seat back to be turned as the seat back is tilted, and a cam member provided coaxially with the center of turning motion of the seat back so as to be turnable with respect to the lever member and the casing member, the cam member being hindered from moving by the lever member when the casing member is turned as the seat back is tilted while a tilting angle of the seat back is in a predetermined range, the casing member includes an exterior tube terminal fixing portion for fixation of a terminal portion of an exterior tube configured to slidably hold the cable, the cam member includes a cable winding groove which is formed along an outer peripheral surface of the cam member and in which the cable drawn out of the terminal portion of the exterior tube is wound, and the cam member is provided with a cable length adjustment mechanism including a cable adjuster and a cable adjuster moving unit, the cable adjuster including a cable terminal fixing portion for fixation of the terminal portion of the cable wound in the cable winding groove and mounted so as to be linearly slidable at an outer peripheral portion of the cam member, and the cable adjuster moving unit being configured to slide the cable adjuster to adjust a length of the cable drawn out of the terminal portion of the exterior tube.

In a further aspect of the invention, the cable adjuster moving unit includes a screw receiving wall formed on the cam member, a screw insertion hole formed to penetrate the screw receiving wall, a screw hole formed in an end surface of the cable adjuster in a slide direction, and an adjustment screw screwed into the screw hole of the cable adjuster with a head portion received by the screw receiving wall and with a distal end side of a screw shaft portion inserted through the screw insertion hole, and the cable adjuster is displaced via the adjustment screw by rotating the adjustment screw.

In another aspect, the cable adjuster moving unit includes a spring configured to urge the cable adjuster in a direction of drawing the cable out of the terminal portion of the exterior tube.

In yet a further aspect, the lever member, the casing member, and the cam member are provided with respective positioning holes configured to penetrate the three members when the members are aligned with each other.

In still another aspect, the cable adjuster is mounted at the outer peripheral portion of the cam member so as to be slidable in a direction of a tangent to a circle centered about the center of turning motion of the seat back.

As used herein, the terms "up-down" and "up-down direction" indicate the direction from the center to the floor or the ceiling of the vehicle. The terms "left-right" and "left-right direction" indicate the vehicle width direction.

The terms "horizontal" and "horizontal direction" include the horizontal (horizontal direction), and may allow such a small error that may be caused during manufacture or that may still produce the effect of the present invention in designing a product.

The term "spline curve" includes curves other than spline curves, such as a curve drawn on the circumference of a circle obtained when a circle provided on a first plane is projected onto a second plane that is not parallel with the first plane from a location vertically above the second plane, for example.

For the phrase "inclination angle of the seat back in the front-back direction of the vehicle", the detection range of the inclination angle of the seat back is set such that the inclination angle is detectable from a state in which the seat back stands upright to allow an occupant to be seated to a state in which the seat back is leaned toward the rear of the vehicle. However, the angle detection portion may be designed such that the inclination angle is detectable from a state in which the seat back is leaned forward to a state in which the seat back is leaned rearward throughout, and the detection range of the inclination angle of the seat back may be set as desired in accordance with a request from a user.

For the phrase "inclined in the left-right direction of the vehicle with respect to a line extending in the up-down direction at the center of the seat back in the left-right direction", only inclination of ±15° in the left-right direction with respect to a line extending in the up-down direction is described in the following embodiment. However, inclination of 0° to ±45° in the left-right direction may be set as long as designed reasonably.

For the phrase "a turning axis of the rotary member and the swing axis of the sensor housing intersect each other at a predetermined angle with respect to the left-right direction of the vehicle", the predetermined angle is determined such that the swing axis of the sensor housing is arranged in the horizontal direction. Basically, the predetermined angle is determined in accordance with the inclination angle of the retractor attached to the seat back with respect to the left-right direction of the vehicle. That is, the predetermined angle is set in accordance with the attachment angle of the retractor.

In the seatbelt device according to the present invention, the rotational track surfaces of the rotary member or the pulley and the sensor housing are non-parallel with each other when rotation by an angle corresponding to the inclination angle of the seat back is transmitted from the rotary member or the pulley to the sensor housing. Because of such non-parallelism, the position of the contact point for power transfer is varied in the radial direction in accordance with the rotational angle position, and the contact point follows a non-circular (elliptical) track. Consequently, a deviation in rotational angle is caused between the rotary member and the sensor housing, or between the pulley and the sensor housing, and the inertial element support surface of the sensor housing may not be kept accurately horizontal with the inclination angle of the seat back and the rotational angle of the sensor housing not synchronized with each other.

With the seatbelt device according to the present invention, however, such a deviation in rotational angle is compensated for by the compensation unit provided between the cable advancing/retracting mechanism and the attitude control mechanism. Thus, the inclination angle of the seat back and the rotational angle of the sensor housing may be accurately synchronized with each other. Thus, it is possible to keep an inertial element support surface, which serves as a sensor reference surface, accurately horizontal even at any seat back inclination angle to improve the accuracy of an acceleration sensor.

The cable length adjustment mechanism is provided at the outer peripheral portion of the cam member which actually detects the tilting angle of the seat back, and adjusts the length of the cable drawn out of the terminal portion of the exterior tube by moving with the cable adjuster pulling the terminal portion of the cable. Thus, the length of the cable may be adjusted accurately such that no slack is caused in the cable. Thus, the accuracy in advancing and retracting the cable in accordance with the reclining angle of the seat back is enhanced to improve the performance of the acceleration sensor. A compact configuration is achieved with the cable adjuster disposed at the outer peripheral portion of the cam member.

BRIEF DESCRIPTION OF THE DRAWINGS

FIG. 1A is a side view of a reclining seat including a seatbelt device according to the present invention, FIG. 1B is a rear view of the reclining seat as a left seat, and FIG. 1C is a rear view of the reclining seat as a right seat;

FIG. 8A is a side view illustrating the seatbelt retractor attached as inclined in the vehicle width direction (rightward), FIG. 8B illustrates the moving track of a pin of an adjustment gear (rotary member) of the attitude control mechanism as seen from a direction perpendicular to the rotational track surface (a surface inclined with respect to a vertical surface) of the adjustment gear, FIG. 8C illustrates the moving track of the pin of the adjustment gear as seen from a direction (horizontal direction) perpendicular to the rotational track surface (vertical surface) of the sensor housing, FIG. 8D illustrates the moving track of a slit as seen from a direction (horizontal direction) perpendicular to the rotational track surface (vertical surface) of the sensor housing, and FIG. 8E is a view in which the moving tracks of FIGS. 8C and 8D are synthesized;

FIG. 9A is a perspective view of a pulley of the attitude control mechanism for use in the seatbelt retractor for the left seat, FIG. 9B is a end view of the pulley, FIG. 9C is a cross-sectional view taken along the line IXc-IXc of FIG. 9B, FIG. 9D is a perspective view of a pulley of the attitude control mechanism for use in the seatbelt retractor for the right seat, FIG. 9E is a end view of the pulley, and FIG. 9F is a cross-sectional view taken along the line IXf-IXf of FIG. 9E;

FIG. 12 is a front view illustrating the internal configuration of the cable advancing/retracting mechanism;

DESCRIPTION OF THE PREFERRED EMBODIMENTS

Figure 2A:
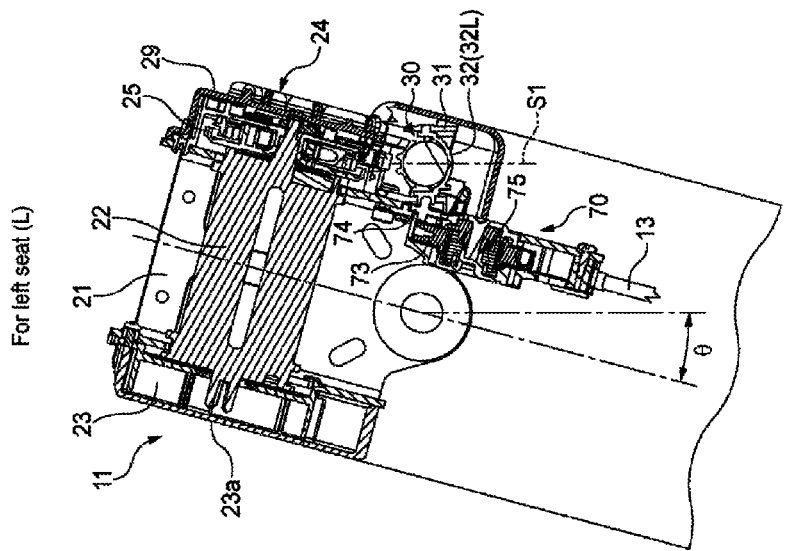
FIG. 2A is a sectional view of a seatbelt retractor for the right seat attached as inclined leftward by a predetermined angle θ as seen from the front side of the vehicle in the first embodiment of the present invention.

A seatbelt device according to an embodiment of the present invention will be described in detail below with reference to the drawings.

As illustrated in FIGS. 1A to 1C, a seatbelt device 10 according to the embodiment includes a seatbelt retractor 11 and a cable advancing/retracting mechanism 100. The seatbelt retractor 11 is attached to a seat back 16 of a reclining seat 15, and capable of winding up a seatbelt 19. The cable advancing/retracting mechanism 100 is disposed at a coupling portion 18 at which the seat back 16 and a seat cushion 17 of the reclining seat 15 are turnably coupled to each other. The cable advancing/retracting mechanism 100 transmits tilting operation of the seat back 16 to the seatbelt retractor 11 via a cable 13a (which is also referred to as an "inner cable") by advancing and retracting the inner cable 13a by a length corresponding to the tilting angle of the seat back 16. The seatbelt device 10 has a function of restraining an occupant in a vehicle with respect to the reclining seat 15 when the vehicle crashes.

The inner cable 13a is covered by an exterior tube 13b (see FIG. 3) to be discussed later to constitute a cable unit 13. Terminal members 13d at both ends of the exterior tube 13b are fixed to the seatbelt retractor 11 and a casing member 120 (see FIG. 11) of the cable advancing/retracting mechanism 100, which is discussed later. This allows the inner cable 13a housed inside the exterior tube 13b to smoothly slide with respect to the exterior tube 13b in the direction of extension to advance and retract without slack in the inner cable 13a.

The seatbelt retractor 11 is tiltable to any angle in the front-back direction of the vehicle in accordance with the reclining angle of the seat back 16. In the vehicle width direction (left-right direction of the vehicle), the seatbelt retractor 11 is attached at a predetermined angle θ that is different in accordance with the vehicle model or the seat specifications in order to enable the seatbelt 19 to be smoothly paid out from the seatbelt retractor 11. Herein, the seatbelt retractor 11 is attached to the seat back 16 in a reference attachment attitude, in which the seatbelt retractor 11 is inclined toward the rear of the vehicle by approximately 15° (leaned rearward by 15°) and inclined by a predetermined angle θ (=15°) in the vehicle width direction. That is, for a left seat, the seatbelt retractor 11 is attached as inclined leftward by the predetermined angle θ (=15°) as seen from the rear side as illustrated in FIG. 1B, and for a right seat, attached as inclined rightward by the predetermined angle θ (=15°) as seen from the rear side as illustrated in FIG. 1C.

Figure 2B:
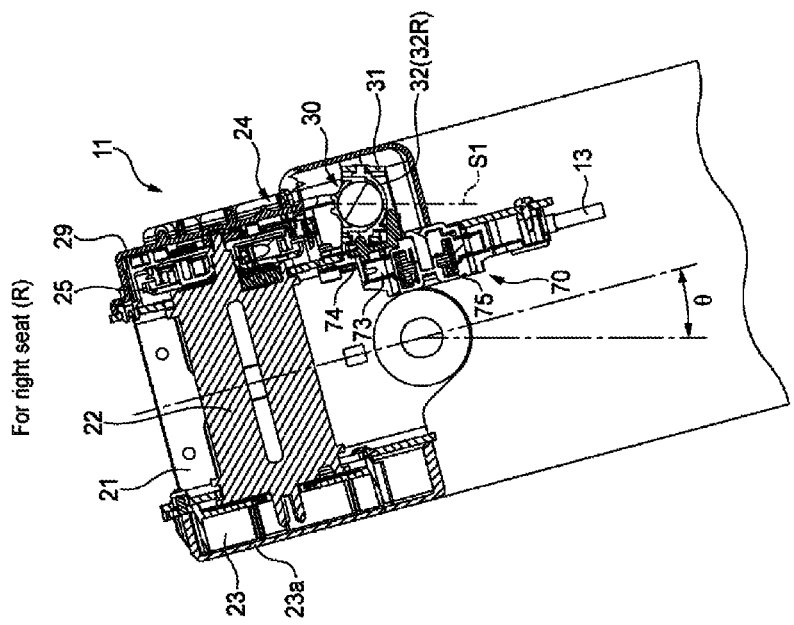
FIG. 2B is a sectional view of a seatbelt retractor for the left seat attached as inclined rightward by the predetermined angle θ as seen from the front side of the vehicle.
Figure 3:
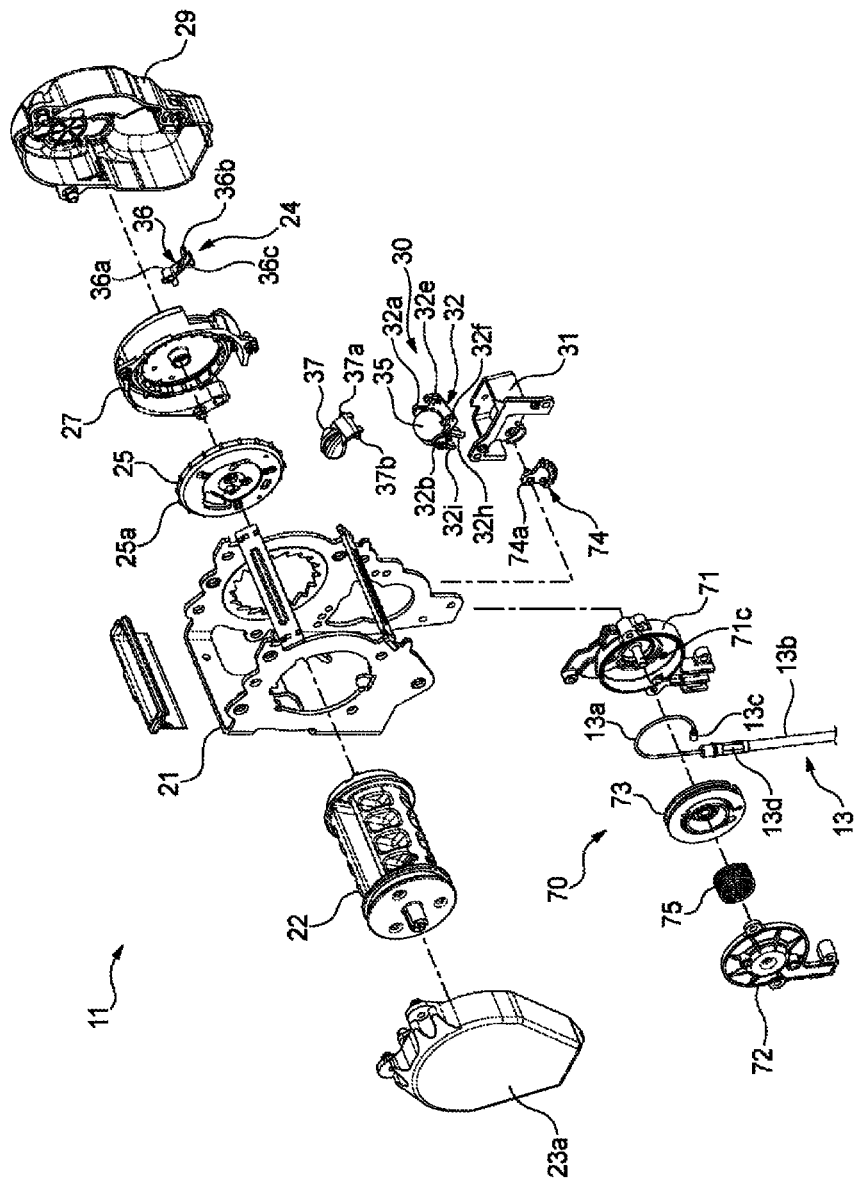
FIG. 3 is an exploded perspective view of the seatbelt retractor.

As illustrated in FIGS. 2 and 3, the seatbelt retractor 11 includes a retractor frame 21 fixed to the seat back 16 as inclined in the left-right direction of the vehicle with respect to a line extending in the up-down direction at the center of the seat back 16 in the left-right direction. A spindle 22 configured to wind up the seatbelt 19 is rotatably supported on the retractor frame 21.

A retractor spring 23 is coupled on the one end side of the spindle 22 in the axial direction. The retractor spring 23 urges the spindle 22 to rotate in the direction of winding up the seatbelt 19. The retractor spring 23 is housed in a cover 23a.

A steering wheel 25, an acceleration sensor 30, and an attitude control mechanism 70 are provided on the other end side of the spindle 22 in the axial direction. The steering wheel 25 is a constituent element of a lock mechanism 24 configured to lock draw-out operation for the seatbelt 19. The acceleration sensor 30 detects acceleration in the front-back direction applied to the vehicle, and actuates the lock mechanism 24 in accordance with the detected acceleration. The attitude control mechanism 70 keeps a sensor reference surface (inertial element support surface 33 to be discussed later) generally horizontal irrespective of the tilting angle of the seat back 16.

The steering wheel 25 is joined so as to rotate together with the spindle 22, and has a plurality of engagement lugs 25a arranged on the outer peripheral surface at predetermined intervals in the circumferential direction to engage with an upper lug portion 36b of an actuation member (first sensor lever 36) to be discussed later. The steering wheel 25 is housed inside a steering wheel cover 27. The entire side surface of the seatbelt retractor 11 on the other end side including the acceleration sensor 30 is covered by a retractor cover 29.

Figure 4:
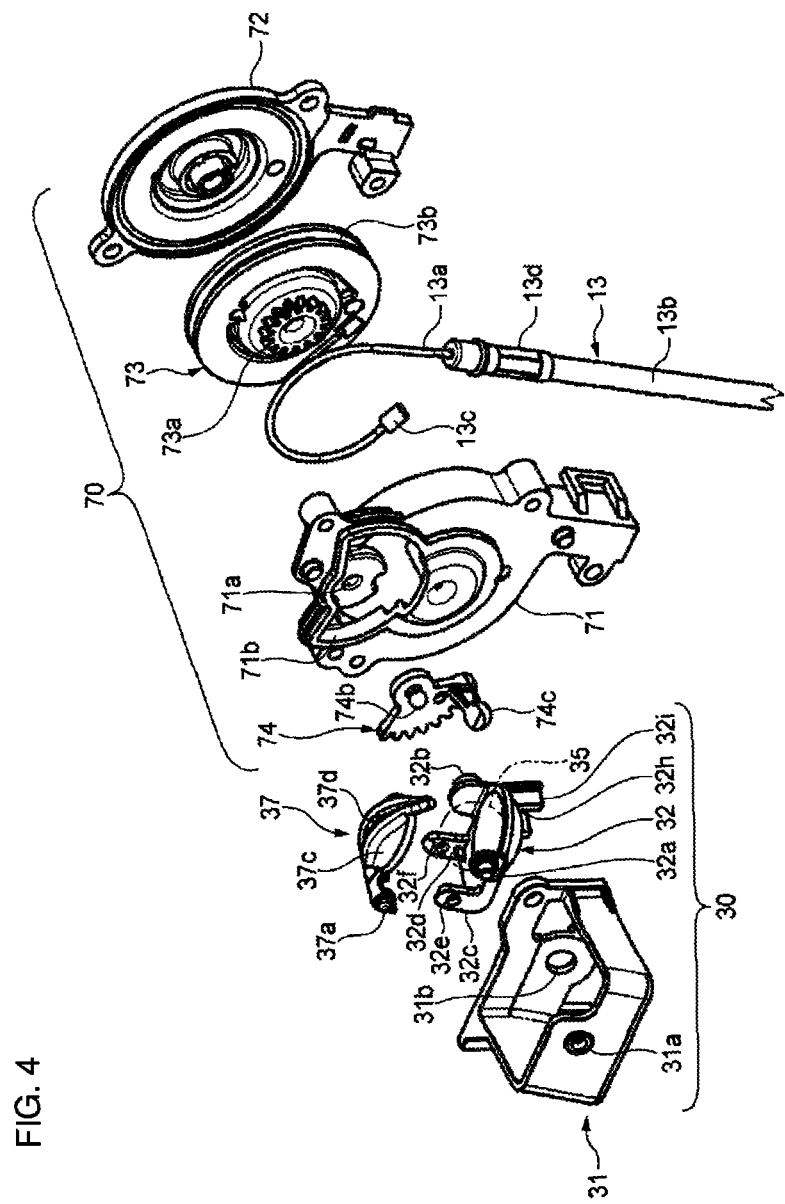
FIG. 4 is an exploded perspective view of an acceleration sensor and an attitude control mechanism of the seatbelt retractor.
Figure 5A:
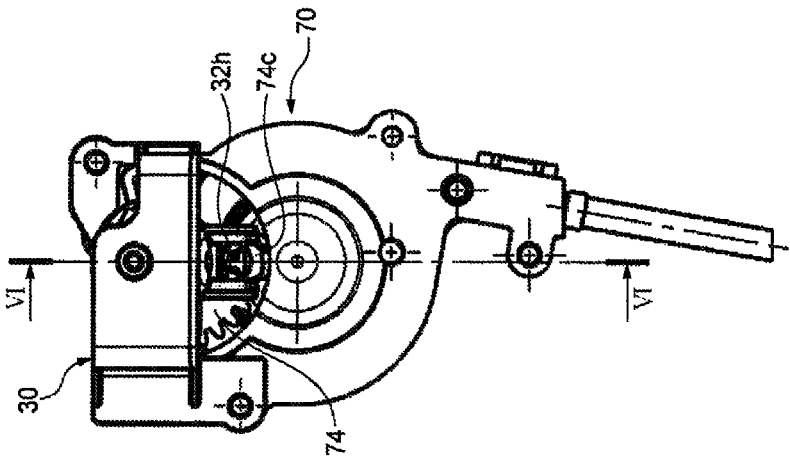
FIG. 5A is a perspective view illustrating the acceleration sensor and the attitude control mechanism in an assembled state.
Figure 5B:
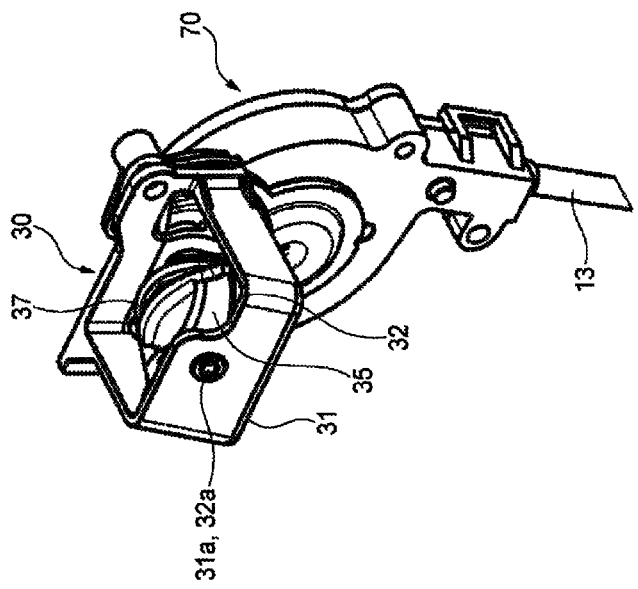
FIG. 5B is a side view of the assembly.

As illustrated in FIGS. 3 and 4, the acceleration sensor 30 includes a sensor cover 31, a sensor housing 32, an iron ball 35, and a second sensor lever 37. The sensor cover 31 is fixed to the outside surface of the retractor frame 21 so as to be tiltable in the front-back direction of the vehicle together with the seat back 16. The sensor housing 32 is supported so as to be swingable in the front-back direction of the vehicle with respect to the sensor cover 31 about a swing axis L1 (see FIG. 6) extending along the left-right direction of the vehicle. The sensor housing 32 is turned in the front-back direction of the vehicle with respect to the sensor cover 31 by the attitude control mechanism 70 when the seat back 16 is tilted to keep the inertial element support surface 33, which serves as the sensor reference surface, generally horizontal in the front-back direction of the vehicle. The ball 35 serves as an inertial element supported on the inertial element support surface 33 of the sensor housing 32 to be displaced from the neutral position when acceleration in the front-back direction of the vehicle that is a predetermined value or more is applied. The second sensor lever 37 serves as an actuation member configured to actuate the lock mechanism 24 to lock the draw-out operation in conjunction with displacement of the ball 35 in the front-back direction of the vehicle.

Figure 6:
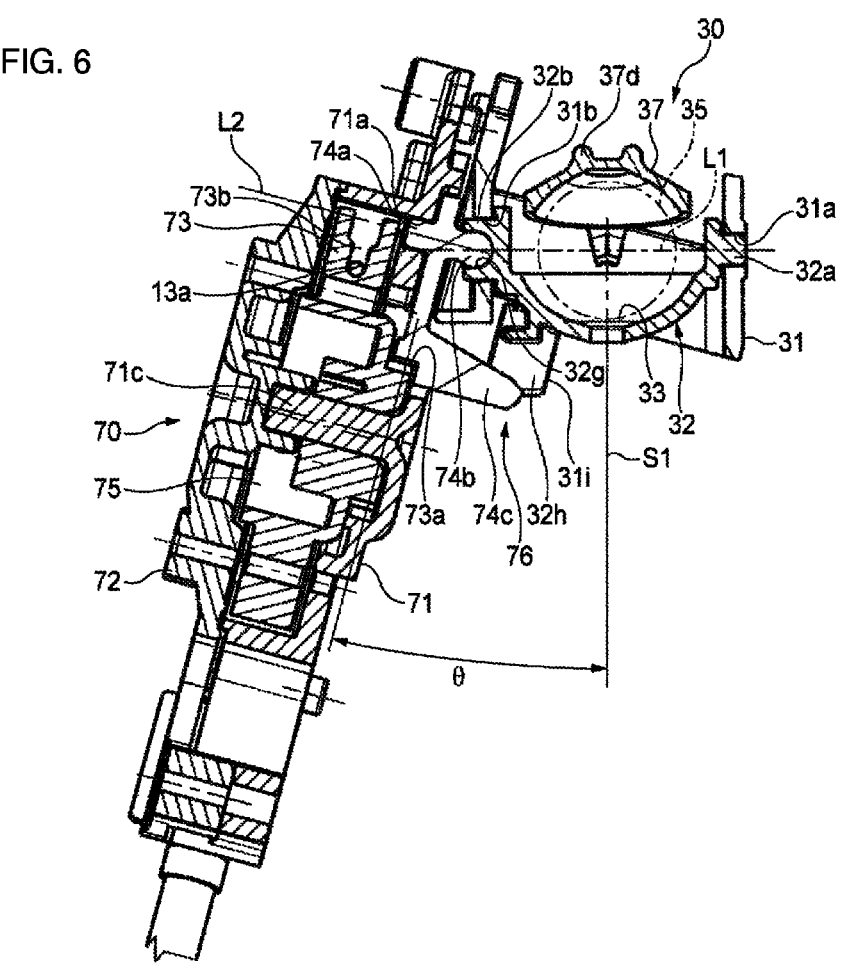
FIG. 6 is a sectional view taken along the line VI-VI of FIG. 5B and illustrating the seatbelt retractor attached as inclined rightward by the predetermined angle θ.

Specifically, as also illustrated in FIG. 6, a pair of boss portions 32a and 32b provided to project from the outside surface of the sensor housing 32 are fitted in a pair of support holes 31a and 31b of the sensor cover 31, respectively, to constitute the swing axis L1. This makes the sensor housing 32 swingable in the front-back direction of the vehicle about the swing axis L1. As illustrated in FIG. 4, a pair of turning projections 37a and 37b of the second sensor lever 37 are fitted in lever support holes 32e and 32f formed in a pair of brackets 32c and 32d of the sensor housing 32, respectively. Thus, the second sensor lever 37 is supported so as to be turnable in the front-back direction of the vehicle with respect to the sensor housing 32.

The sensor housing 32 has the inertial element support surface 33, which is a bowl-shaped downwardly concave surface, as the upper inner bottom surface. The ball 35 is placed on the inertial element support surface 33. The ball 35, which serves as an inertial element, is displaced from the neutral position upon receiving acceleration in the front-back direction of the vehicle that is a predetermined value or more to sense acceleration applied to the vehicle (that is, the seatbelt retractor 11). When the inertial element support surface 33 discussed earlier is generally horizontal, it is meant that the reference surface of the inertial element support surface 33 (for example, the upper surface of the inertial element support surface 33) is generally horizontal.

As illustrated in FIG. 3, the first sensor lever 36 is formed in a generally Y shape. The base end portion of the first sensor lever 36 has a boss portion 36a provided with a fitting hole.

The distal end portion of the first sensor lever 36 has the upper lug portion 36b in abutment with the steering wheel 25 and a lower lug portion 36c in abutment with the second sensor lever 37. The first sensor lever 36 is disposed below the steering wheel 25. The fitting hole of the boss portion 36a is turnably fitted with a support shaft (not illustrated) fixed to the retractor frame 21. When the first sensor lever 36 is turned upward about the boss portion 36a having the fitting hole, the upper lug portion 36b is engaged with the engagement lugs 25a of the steering wheel 25 to restrict rotation of the steering wheel 25. Thus, the steering wheel 25 and the first sensor lever 36 constitute the lock mechanism 24.

As illustrated in FIGS. 3 and 4, the second sensor lever 37 includes the turning projections 37a and 37b formed at the base end portion, a cup portion 37c formed on the distal end side to cover the upper surface of the ball 35, and a rib 37d formed on the upper surface of the cup portion 37c. The turning projections 37a and 37b are turnably fitted in the lever support holes 32e and 32f of the sensor housing 32, respectively. The cup portion 37c of the second sensor lever 37 contacts the upper side of the ball 35. The lower lug portion 36c of the first sensor lever 36 abuts against the upper surface of the rib 37d. When the ball 35 is displaced from the neutral position by acceleration, the second sensor lever 37 is turned upward to push the first sensor lever 36 upward via the lower lug portion 36c, which engages the upper lug portion 36b with the engagement lugs 25a of the steering wheel 25 to lock the steering wheel 25. The turning axes of the first sensor lever 36 and the second sensor lever 37 are positioned in directions opposite to each other from the center of the ball 35 so as to be turned in directions opposite to each other when the ball 35 is displaced.

As illustrated in FIGS. 3, 4, and 6, the attitude control mechanism 70 which controls the attitude of the sensor housing 32 in the front-back direction is composed of a first pulley case 71, a second pulley case 72, a pulley 73, an adjustment gear 74, a torsion spring 75, and a rotation transfer mechanism 76. The first pulley case 71 and the second pulley case 72 are disposed inside side plates of the retractor frame 21. The pulley 73 is housed in an internal space formed by combining the first pulley case 71 and the second pulley case 72 with each other. The torsion spring 75 urges the pulley 73 to rotate. The rotation transfer mechanism 76 transfers rotation of the adjustment gear 74 to the sensor housing 32 of the acceleration sensor 30.

The pulley 73 is supported by the first pulley case 71 and the second pulley case 72 so as to be rotatable about a support shaft 71c provided at the first pulley case 71. The pulley 73 converts advancing and retracting motion of the inner cable 13a caused by the cable advancing/retracting mechanism 100 into rotational motion to rotate in the same direction as the tilting direction of the seat back 16 by an angle corresponding to the advancing and retracting motion of the inner cable 13a. A cable winding groove 73b configured to receive the inner cable 13a is provided in the outer peripheral surface of the pulley 73. The one end portion (upper end portion) of the inner cable 13a is fixed to the pulley 73 via an end block 13c. The inner cable 13a is slidably inserted in the exterior tube 13b. The terminal member 13d attached to one end of the exterior tube 13b is fixed to the first pulley case 71 and the second pulley case 72.

The torsion spring 75 (see FIG. 3) urges the pulley 73 to rotate in the direction of winding up the inner cable 13a. The adjustment gear 74 is a rotary member meshed with a gear 73a formed at a side portion of the pulley 73 to synchronously rotate by the same rotational angle in the direction opposite to the tilting direction of the seat back 16. As illustrated in FIG. 6, the adjustment gear 74 is supported so as to be turnable about a turning axis L2 with one shaft projection 74a fitted in a support hole 71a formed in the first pulley case 71 and with the other shaft projection 74b having a spherical distal end fitted in a spherical hole 32g formed in an end surface of the boss portion 32b of the sensor housing 32 through a window 71b (see FIG. 4) of the first pulley case 71. In this case, with the spherical hole 32g and the spherical shaft projection 74b fitted with each other, the turning axis L2 of the adjustment gear 74 and the swing axis L1 of the sensor housing 32 intersect each other at one point at the center of the shaft projection 74b even if the two axes are in any angular relationship. That is, the turning axis L2 and the swing axis L1 of the sensor housing 32 are configured to intersect each other at one point with the turning axis L2 inclined with respect to the swing axis L1 by a certain angle both in the case where the two axes are on an identical line and in the case where the two axes are inclined with respect to each other.

The rotation transfer mechanism 76 is configured to swing the sensor housing 32 by transferring rotation of the adjustment gear 74 to the sensor housing 32 both in the case where the turning axis L2 of the adjustment gear 74 and the swing axis L1 of the sensor housing 32 are on an identical line and in the case where the two axes are inclined with respect to each other. Consequently, the rotation transfer mechanism 76 causes a sensor reference line S1 of the acceleration sensor 30 (a line that is perpendicular to the sensor reference surface which passes through the center point of the ball 35 in the neutral position) to be oriented in the vertical direction in the front-back direction of the vehicle to keep the inertial element support surface 33, which is perpendicular to the sensor reference line S1 and serves as the sensor reference surface, generally horizontal. Therefore, the rotation transfer mechanism 76 in the embodiment is constituted by a combination of a pin 74c and a slit 32h formed on the adjustment gear 74 and in the sensor housing 32, respectively, and disposed at positions away from the swing axis L1 and the turning axis L2 in the radial direction to be engaged with each other.

Figure 7A:
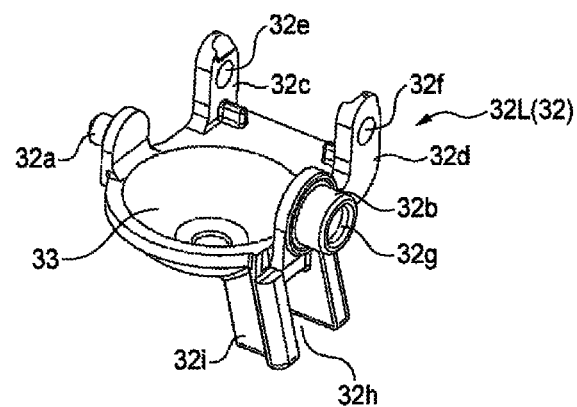
FIG. 7A is a perspective view illustrating the configuration of a sensor housing for use in the seatbelt retractor for the left seat.
Figure 7B:
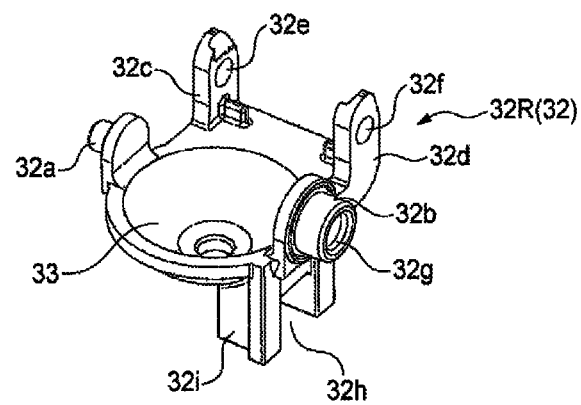
FIG. 7B is a perspective view illustrating the configuration of a sensor housing for use in the seatbelt retractor for the right seat.

Although the pin 74c is formed on the adjustment gear 74 and the slit 32h is formed in the sensor housing 32 herein, the pin may be formed on the sensor housing 32 and the slit may be formed in the adjustment gear 74. The slit 32h is formed in an arm 32i provided to project downward from a side portion of the sensor housing 32. It is necessary that the arm 32i should allow the slit 32h and the pin 74c to be reliably engaged with each other and not interfere with other portions. Therefore, the shape of the arm 32i is slightly different between a sensor housing 32L (32) for use in the seatbelt retractor for the left seat illustrated in FIG. 7A and a sensor housing 32R (32) for use in the seatbelt retractor for the right seat illustrated in FIG. 7B.

The seatbelt retractor 11 configured as described above is attached to the seat back 16 in a reference attachment attitude that is different in accordance with the vehicle model or the seat specifications. For example, the seatbelt retractor 11 is attached as inclined toward the rear of the vehicle by approximately 15° and inclined by θ=15° in the vehicle width direction (left-right direction). The seatbelt retractor 11 is attached in different inclination directions and at different angles in the vehicle width direction in accordance with the vehicle type or the seat specifications in order to enable the seatbelt 19 to be smoothly drawn out by matching the inclination of the spindle 22 in the vehicle width direction with the direction in which the seatbelt 19 is drawn out.

Thus, there are two attachment attitudes. In one of the two attachment attitudes, as illustrated in FIG. 6, the retractor frame 21 is attached as inclined rightward by a predetermined angle θ (=15°) so that the rotational track surface of the pulley 73 and the adjustment gear 74 of the attitude control mechanism 70 is inclined rightward with respect to a vertical plane by the predetermined angle θ. Conversely, in the other attachment attitude, although not illustrated, the retractor frame 21 is attached as inclined leftward by the predetermined angle θ so that the rotational track surface of the pulley 73 and the adjustment gear 74 of the attitude control mechanism 70 is inclined leftward with respect to a vertical plane by the predetermined angle θ.

Because of such an attachment attitude, the embodiment is made on the premise that the turning axis L2 of the adjustment gear 74 is inclined with respect to a horizontal direction extending along the left-right direction of the vehicle by the predetermined angle θ. Different sensor covers 31 for the left and right seats are prepared so that the sensor reference line S1 of the acceleration sensor 30 is oriented in the vertical direction with the swing axis L1 of the sensor housing 32 of the acceleration sensor 30 kept generally horizontal even in the case where the turning axis L2 of the adjustment gear 74 is inclined with respect to the horizontal. Therefore, the turning axis L2 of the adjustment gear 74 which is inclined with respect to the horizontal and the swing axis L1 of the sensor housing 32 which is kept horizontal are not on an identical line, and the predetermined angle θ is made between the two axes.

Since the two axes (the swing axis L1 and the turning axis L2) are not on an identical line, the turning axis L2 of the adjustment gear 74 and the swing axis L1 of the sensor housing 32 are separate from each other and arranged to intersect each other at one point with the predetermined angle θ made between the two axes as discussed above. Then, the pin 74c and the slit 32h discussed earlier are combined with each other to constitute the rotation transfer mechanism 76.

The attachment angle of the retractor frame 21 may be set to any angle including θ=0°. The swing axis L1 of the sensor housing 32 may be always kept generally horizontal by attaching the acceleration sensor 30 to the retractor frame 21 using a dedicated sensor cover 31 prepared for each set attachment angle. In this event, rotation of the adjustment gear 74 may be naturally transmitted to the sensor housing 32 through the combination of the pin 74c and the slit 32h both in the case where the swing axis L1 of the sensor housing 32 and the turning axis L2 of the adjustment gear 74 are on an identical line and in the case where the two axes intersect each other as inclined with respect to each other (that is, both in the case where the rotational track surface of the adjustment gear 74 and the rotational track surface of the sensor housing 32 are parallel with each other and in the case where the two rotational track surfaces are non-parallel with each other).

Herein, it is necessary that the inclination angle (reclining angle) of the seat back 16 and the rotational angle of the sensor housing 32 (rotational angle in the direction opposite to the tilting angle of the seat back 16) should be accurately synchronized with each other. If the rotational angle of the seat back 16 and the rotational angle of the sensor housing 32 are not accurately synchronized with each other, the inertial element support surface 33 may not be kept accurately horizontal, which may not allow the acceleration sensor 30 to react precisely.

If the rotational track surface of the pulley 73 and the adjustment gear 74 and the rotational track surface of the sensor housing 32 are non-parallel with each other in the case where rotation is transmitted from the adjustment gear 74 to the sensor housing 32 through the slit 32h and the pin 74c as in the configuration described above, a deviation in rotational angle due to such non-parallelism may be caused between the adjustment gear 74 and the sensor housing 32.

That is, in the case where the rotational track surfaces of the adjustment gear 74 and the sensor housing 32 are parallel with each other and the two axes (the turning axis L2 and the swing axis L1) are on an identical line, for example, the position of the contact point for power transfer between the pin 74c and the slit 32h is constant and not varied when the adjustment gear 74 and the sensor housing 32 rotate, and thus the contact point follows a perfect circle track. In the case where the rotational track surfaces of the adjustment gear 74 and the sensor housing 32 are non-parallel with each other, however, the position of the contact point is varied in the radial direction in accordance with the rotational angle, and therefore the contact point follows a non-circular (elliptical) rotational track.

A detailed description will be made below with reference to FIG. 8. A rotational track K1 of the slit 32h of the sensor housing 32 is a perfect circle as seen from a horizontal direction that is perpendicular to the rotational track surface (vertical surface) of the sensor housing 32 as illustrated in FIG. 8D. However, a rotational track K2 of the pin 74c of the adjustment gear 74 is a perfect circle as seen from a horizontal direction that is perpendicular to the rotational track surface (vertical surface) of the adjustment gear 74 as illustrated in FIG. 8B, but is an ellipse as seen from a horizontal direction that is perpendicular to the rotational track surface (vertical surface) of the sensor housing 32 as illustrated in FIG. 8C.

Therefore, the position of the contact point is varied in the radial direction in accordance with the rotational angle, and the contact point follows a non-circular track (which matches the elliptical track of the pin 74c) rather than a perfect circle track as illustrated in FIG. 8E. Consequently, a deviation in rotational angle is caused between the adjustment gear 74 and the sensor housing 32. For example, when the adjustment gear 74 is turned by 60°, the sensor housing 32 may be turned by 58° or 62°. Then, the inclination angle of the seat back 16 and the rotational angle of the sensor housing 32 are not synchronized with each other, and the inertial element support surface 33 of the sensor housing 32 may not be kept precisely horizontal.

Also in the case where the inclination direction of the attitude control mechanism 70 is opposite to that in FIG. 8A, the position of the contact point between the pin 74c and the slit 32h varied in the radial direction in accordance with the rotational angle, and the contact point follows an elliptical track. It should be noted, however, that the shape of the ellipse is different in accordance with differences in inclination direction of the attitude control mechanism 70.

Thus, a compensation unit configured to compensate for such a deviation in rotational angle is provided between the cable advancing/retracting mechanism 100 and the attitude control mechanism 70. The compensation unit transmits the inclination angle of the seat back 16 to the sensor housing 32 while correcting the inclination angle in accordance with the expected deviation in rotational angle. Consequently, the sensor housing 32 is turned with the deviation in rotational angle compensated for, which allows the sensor housing 32 to be turned substantially in synchronization with the inclination angle of the seat back 16.

Specifically, the compensation unit is provided at the pulley 73 of the attitude control mechanism 70 because advancing and retracting motion of the inner cable 13a extending from the cable advancing/retracting mechanism 100 precisely reflects the inclination angle of the seat back 16. That is, the attitude control mechanism 70 is provided with the pulley 73 which converts advancing and retracting motion of the inner cable 13a into rotational motion to transmit rotation to the adjustment gear 74, and the path of the cable winding groove 73b of the pulley 73 in the circumferential direction is formed in a non-perfect circle spline curve shape so that a radius r of the cable winding groove 73b is varied in accordance with the rotational angle of the pulley 73. That is, the compensation unit is constituted by the cable winding groove 73b of the pulley 73 formed in a spline curve shape with a variable radius.

Figure 10:
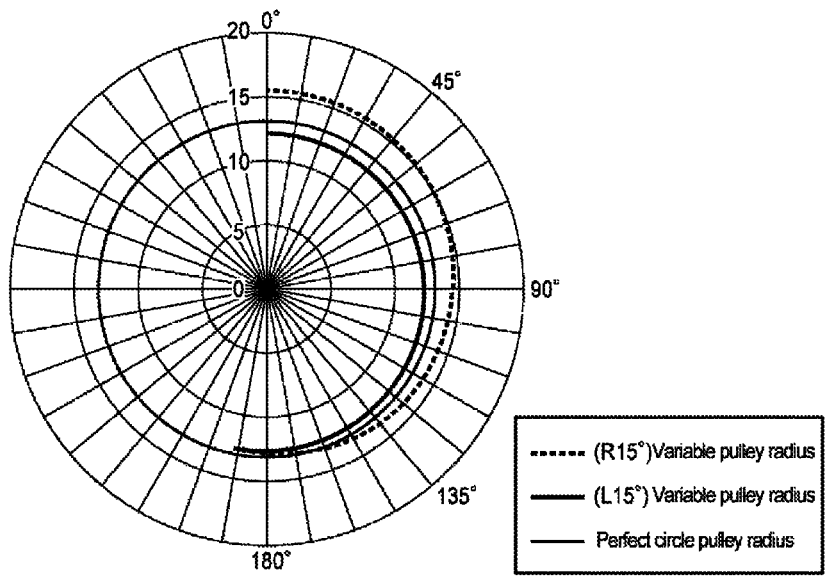
FIG. 10 illustrates variations in radius of a cable winding groove of the pulley from the center of rotation [radius r of a cable winding groove 73b of FIGS. 9C and 9F]

The profile (spline curve) of the cable winding groove 73b is set on the basis of data on the deviation in rotational angle between the adjustment gear 74 and the sensor housing 32 obtained through calculation or actual measurement. FIGS. 9A to 9C illustrate the configuration of a pulley (which is referred to as an "L15° pulley" for convenience) for use in the seatbelt retractor for the left seat. FIGS. 9D to 9F illustrate the configuration of a pulley (which is referred to as an "R15° pulley" for convenience) for use in the seatbelt retractor for the right seat. FIG. 10 illustrates the profiles (variations in radius r from the center of rotation) of the cable winding grooves 73b of the L15° pulley 73L and the R15° pulley 73R compared with that of a perfect circle pulley.

The radius r of the cable winding groove 73b of both the pulleys 73L and 73R is determined to have a profile that allows compensation for the deviation in rotational angle between the adjustment gear 74 and the sensor housing 32. Thus, the inclination angle of the seat back 16 and the rotational angle of the sensor housing 32 may be accurately synchronized with each other by incorporating the pulley 73L or 73R in the attitude control mechanism 70. This allows the inertial element support surface 33, which serves as the sensor reference surface, to be kept accurately horizontal even at any seat back inclination angle to improve the accuracy of the acceleration sensor 30.

Next, the cable advancing/retracting mechanism 100 will be described in detail.

Figure 11:
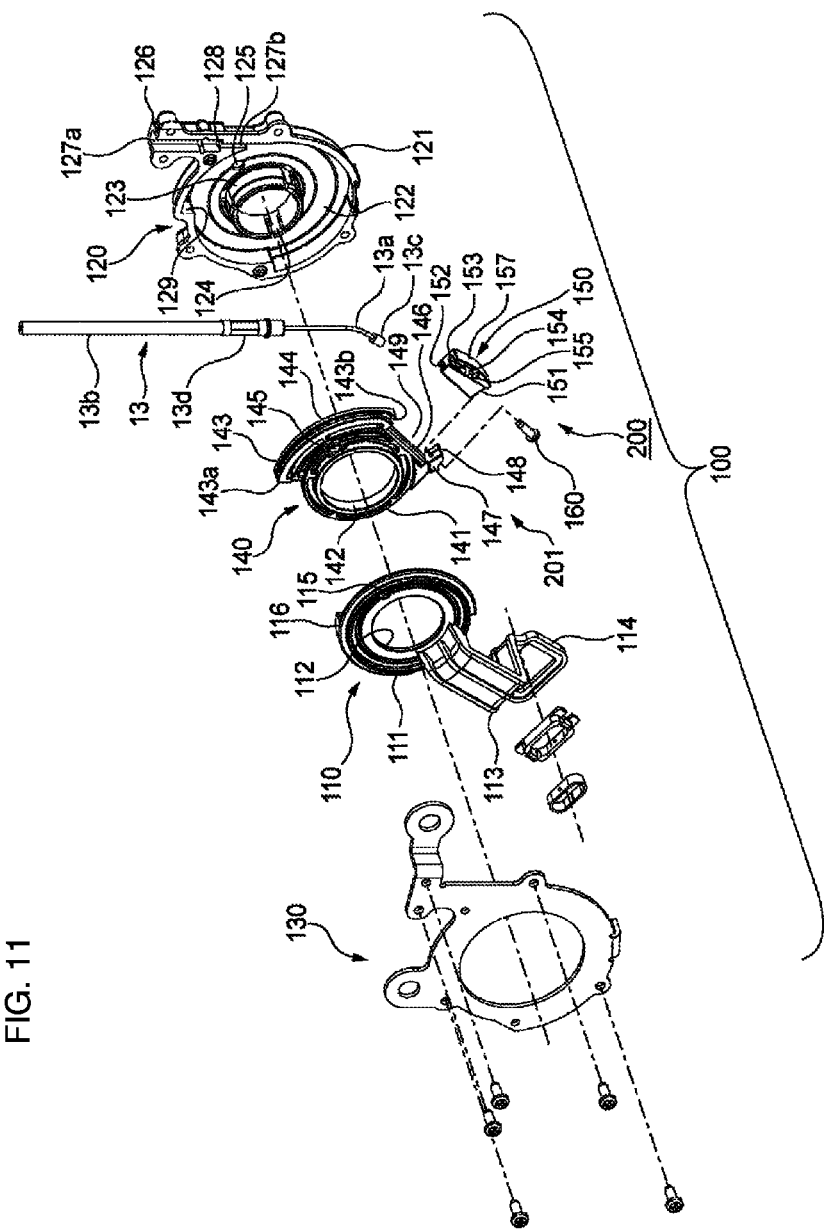
FIG. 11 is an exploded perspective view illustrating the configuration of a cable advancing/retracting mechanism.

As illustrated in FIGS. 11 and 12, the cable advancing/retracting mechanism 100 includes a lever member 110, the casing member 120, a cover 130, a cam member 140, and a cable length adjustment mechanism 200. The cover 130 blocks an opening of the casing member 120. The cam member 140 is turnably housed inside the casing member 120. The cable length adjustment mechanism 200 is composed of a cable adjuster 150 and a cable adjuster moving unit 201.

The lever member 110 includes an arm 113, a ring portion 111, and a stopper projection 116. The arm 113 extends in the direction of a radius of rotation of the casing member 120. The ring portion 111 is integrated at a base end portion of the arm 113, and has a circular hole 112 that is provided in the center of the ring portion 111 and that is coaxial with the center of turning motion of the seat back 16. The stopper projection 116 is provided to project in the axial direction from a side surface of the ring portion 111. The lever member 110 is fixed to the seat cushion 17 through a distal end portion 114 of the arm 113.

The casing member 120 includes an annular outer peripheral wall 121, a cylindrical boss portion 123, and a cable introduction portion 126. The outer peripheral wall 121 covers the periphery of the cam member 140. The boss portion 123 is provided on the inner side of the outer peripheral wall 121 via an annular recessed portion 122. The cable introduction portion 126 projects to the outside from a part of the outer peripheral wall 121. The cable introduction portion 126 is provided with cable guide grooves 127a and 127b that extend in the direction of a tangent to the annular recessed portion 122. The cable guide groove 127a on the outer side is formed to have a size (large groove width) that allows insertion of the terminal of the exterior tube 13b of the cable unit 13 and the terminal member 13d attached to the terminal. The cable guide groove 127b on the inner side is formed to have a size (small groove width) that allows insertion of only the inner cable 13a drawn out of the terminal of the exterior tube 13b. The cable guide groove 127a on the outer side is provided with an exterior tube terminal fixing portion 128 for positioning and fixing of the terminal member 13d of the exterior tube 13b.

An abutment stepped portion 129 is provided on the inner periphery of the outer peripheral wall 121 of the casing member 120. The abutment stepped portion 129 abuts against one end 143a of a cam portion 143 of the cam member 140 to be discussed later when the casing member 120 is turned in the direction of the arrow Y2 of FIG. 12 to rotate the cam member 140 in the same direction in an accompanying manner.

The casing member 120 is fixed to the seat back 16 together with the cover 130 with the boss portion 123 positioned at the coupling portion 18 (see FIG. 1) at which the seat cushion 17 and the seat back 16 are turnably coupled to each other. With the boss portion 123 of the casing member 120 fitted into the circular hole 112 of the lever member 110, the casing member 120 is coupled coaxially with the center of turning motion of the seat back 16 so as to be turnable about the boss portion 123 with respect to the lever member 110, and turned as the seat back 16 is tilted.

The cam member 140 is provided coaxially with the center of turning motion of the seat back 16 so as to be turnable with respect to the lever member 110 and the casing member 120. The inner cable 13a is wound around and drawn out of the cam member 140 in accordance with rotation to advance and retract the cable 13a over a distance corresponding to the inclination angle of the seat back 16. While the tilting angle of the seat back 16 is in a predetermined range (a range in which the function of the acceleration sensor 30 is used), the cam member 140 abuts against the stopper projection 116 of the lever member 110 to be discussed later to be hindered from moving when the casing member 120 is turned as the seat back 16 is tilted.

In the cam member 140, a circular hole 142 is formed in the center of a ring portion 141, a fan-shaped cam portion 143 is formed at the outer peripheral portion of a part of the ring portion 141 in the circumferential direction, and a cable winding groove 144 is formed in the outer peripheral surface of the cam portion 143 to extend along an arc centered about the center of turning motion of the cam member 140. The cam member 140 is turnably fitted with the boss portion 123 of the casing member 120 to be housed in the annular recessed portion 122 of the casing member 120.

The one end 143a of the fan-shaped cam portion 143 in the circumferential direction abuts against the stopper projection 116 of the lever member 110. The cam member 140 is hindered from turning in the direction of the arrow Y1 in FIG. 12 with the one end 143a in abutment with the stopper projection 116.

The boss portion 123 of the casing member 120 is provided with a flexible lug 124 configured to prevent the ring portion 111 of the lever member 110 and the ring portion 141 of the cam member 140 from slipping off with the ring portion 111 and the ring portion 141 fitted with the boss portion 123. The lever member 110, the cam member 140, and the casing member 120 are provided with positioning holes 115, 145, and 125, respectively, configured to penetrate the three members 110, 140, and 120 when the members are aligned with each other with the seat back 16 in the standard position.

An adjuster housing recessed portion 149 is provided in a part of the ring portion 141 of the cam member 140 in the circumferential direction, adjacent to the other end 143*b* of the fan-shaped cam portion 143. The cable adjuster 150 which constitutes the cable length adjustment mechanism 200 is housed in the adjuster housing recessed portion 149. The cable adjuster 150 adjusts the length of the cable 13*a* by fixing a terminal portion of the cable 13*a* on the base end (lower end) side to the cam member 140 and pulling the cable 13*a* to eliminate slack in the cable 13*a*. The distal end (upper end) of the cable 13*a* is wound around the pulley 73 (see FIGS. 4 and 6) of the attitude control mechanism 70.

The cable adjuster 150 includes an adjuster main body 151 which is a small piece in a generally rectangular parallelepiped shape. The adjuster main body 151 is mounted to the cam member 140 so as to be linearly slidable in the direction of a tangent to a circle centered about the center of turning motion of the cam member 140 (center of turning motion of the seat back 16). In order to guide slide operation of the adjuster main body 151, a C-shaped guide rail 152 is provided on the inside surface of the adjuster main body 151. The guide rail 152 is fitted with a guide rail 146 having a T-shaped cross section and formed at the bottom of the adjuster housing recessed portion 149 of the cam member 140. The guide rail 146 having a T-shaped cross section and the C-shaped guide rail 152 are fitted with each other utilizing elasticity of a resin material constituting the guide rails, and guide the cable adjuster 150 so as to slide in the direction of the tangent. The guide rail 146 having a T-shaped cross section may be provided on the adjuster main body 151, and the C-shaped guide rail 152 may be provided on the cam member 140. The adjuster main body 151 may slide linearly as inclined with respect to the direction of a tangent to a circle, or may slide linearly in a direction other than the direction of a tangent to a circle.

A cable terminal fixing portion 154 is provided on the one end side of the adjuster main body 151 in the slide direction (on the side closer to the other end 143*b* of the cam portion 143). The cable terminal fixing portion 154 houses the end block 13*c* attached to the terminal of the inner cable 13*a* wound in the cable winding groove 144 to fix the terminal portion of the inner cable 13*a*. The cable terminal fixing portion 154 is constituted as a recessed portion, and provided at the deepest end of a cable guide groove 153 configured to house the inner cable 13*a*. A portion of the inner cable 13*a*, which is drawn out of the terminal portion of the exterior tube 13*b*, in the vicinity of the terminal of the inner cable 13*a* is wound in the cable winding groove 144 of the cam portion 143 of the cam member 140 by a maximum of about one-fourth of a turn.

The cable adjuster moving unit 201 is provided on the other end side of the adjuster main body 151 in the slide direction (on the side farther from the other end 143*b* of the cam portion 143). The cable adjuster moving unit 201 moves the cable adjuster 150 to adjust the length of the cable 13*a* drawn out of the terminal portion of the exterior tube 13*b*.

The cable adjuster moving unit 201 is composed of a screw receiving wall 147, a screw insertion hole 148, a screw hole 156, and an adjustment screw 160. The screw receiving wall 147 is formed at an end portion of the adjuster housing recessed portion 149 of the cam member 140. The screw insertion hole 148 is formed to penetrate the screw receiving wall 147. The screw hole 156 is formed in an end surface of the cable adjuster 150 in the slide direction (the other end surface of the adjuster main body 151 in the slide direction). The adjustment screw 160 is screwed into the screw hole 156 of the cable adjuster 150 with the head portion received by the screw receiving wall 147 and with the distal end side of the screw shaft portion inserted through the screw insertion hole 148. The cable adjuster 150 is displaced to any position in the slide direction via the adjustment screw 160 by rotating the adjustment screw 160.

An outside surface 157 of the adjuster main body 151 of the cable adjuster 150 is formed as an arcuate surface so as to secure a large slide range of the cable adjuster 150 by avoiding interference with the outer peripheral wall 121 of the casing member 120 as much as possible when the cable adjuster 150 is slid. An insertion hole 155 is formed in the adjuster main body 151 at a position closer to the outside surface 157, which is opposite to the guide rail 152, to extend in the plate thickness direction. The insertion hole 155 allows insertion of a jig pin 301 (see FIG. 16) into the cable adjuster 150.

The outer peripheral wall 121 of the casing member 120 is provided with a service window 170 with a lid. The service window 170 allows the adjustment screw 160 to be rotated using a screwdriver from the outside in an assembled state. The cover 130 is screwed to the casing member 120 to cover the opening of the casing member 120 with the cam member 140 and the ring portion 111 of the lever member 110 housed in the casing member 120.

Next, a process for assembling the seatbelt device 10 according to the embodiment to the reclining seat 15 will be described.

As the premise for assembly of the seatbelt device 10 to the reclining seat 15, it is necessary that the sensor housing 32 of the acceleration sensor 30 should be in an adequate attitude when assembled. Herein, the attitude of the sensor housing 32 is adjusted using the cable advancing/retracting mechanism 100 and the cable 13*a*. Thus, it is necessary that the cable advancing/retracting mechanism 100 and the length of the cable 13*a* should be adjusted so as to correspond to the initial position (standard position) of the seat back 16 before assembly of the seatbelt device 10.

Figure 16:
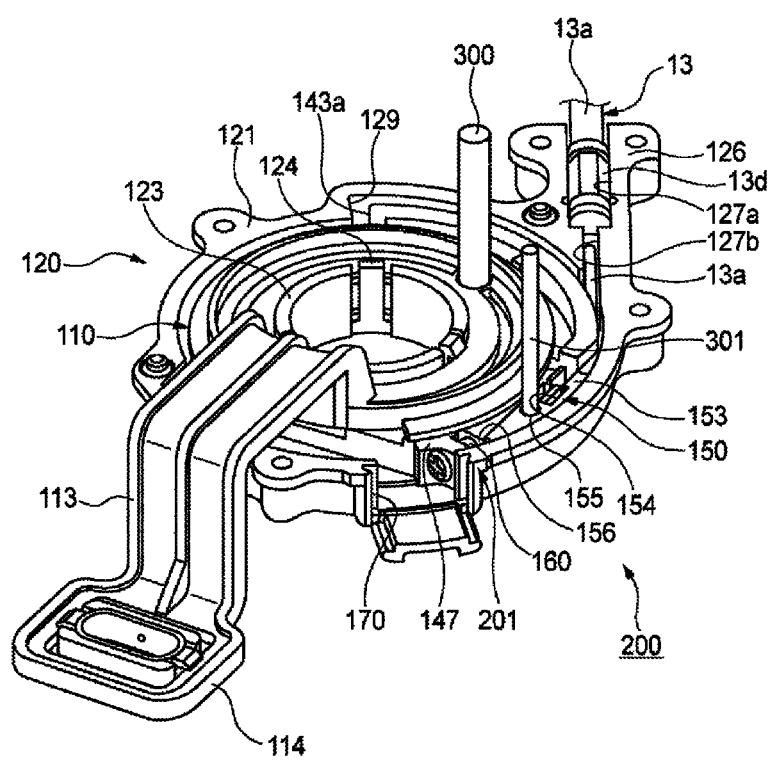
FIG. 16 illustrates a method of adjusting the length of a cable in the cable advancing/retracting mechanism.

That is, it is necessary that the cable advancing/retracting mechanism 100 should be temporarily fixed in a predetermined state, and that the length of the cable 13*a* should be adjusted. In order to temporarily fix the cable advancing/retracting mechanism 100, as illustrated in FIG. 16, a temporarily fixing pin 300 is provided to penetrate the positioning holes 115, 145, and 125 formed in the lever member 110, the cam member 140, and the casing member 120, respectively. This allows the temporarily fixing pin 300 to temporarily fix the lever member 110, the cam member 140, and the casing member 120 so as not to be relatively movable.

After that, the cable advancing/retracting mechanism 100 is attached to the reclining seat 15, a corresponding jig, or the like with the members maintained in the temporarily fixed state, and the adjustment screw 160 of the cable adjuster moving unit 201 is adjusted to adjust the position of the cable adjuster 150. In this event, the terminal portion of the exterior tube 13*b* is fixed to the casing member 120. Thus, the length of the cable 13*a* drawn out of the terminal portion of the exterior tube 13*b* may be adjusted by moving the end block 13*c* of the inner cable 13*a* via the cable adjuster 150. The sensor housing 32 of the acceleration sensor 30 is adjusted to an adequate direction by adequately adjusting the length of the inner cable 13*a* drawn out.

In the adjustment, first, as illustrated in FIG. 16, the temporarily fixing pin 300 is inserted into the positioning holes 115, 145, and 125 of the lever member 110, the cam member 140, and the casing member 120, respectively, to temporarily fix the lever member 110, the cam member 140, and the casing member 120.

Next, the jig pin 301 is inserted into the insertion hole 155 of the cable adjuster 150, and the cable adjuster 150 is slid with a constant load in the direction of the arrow Z to eliminate slack in the cable 13a. At this time, the load with which the jig pin 301 is pushed is monitored by a load cell.

Next, the adjustment screw 160 is tightened in that state. The head portion of the adjustment screw 160 tightly contacts the receiving surface of the screw receiving wall 147 of the cam member 140. When the adjustment screw 160 is further tightened, the cable adjuster 150 is pulled to reduce a force with which the jig pin 301 is pushed. When the load with which the jig pin 301 is pushed indicated by the load cell is reduced to a set load, tightening of the adjustment screw 160 is stopped. The adjustment of the length of the inner cable 13a is thus completed.

Next, operation of the cable advancing/retracting mechanism 100 to advance and retract the inner cable 13a will be described.

Figure 13A:
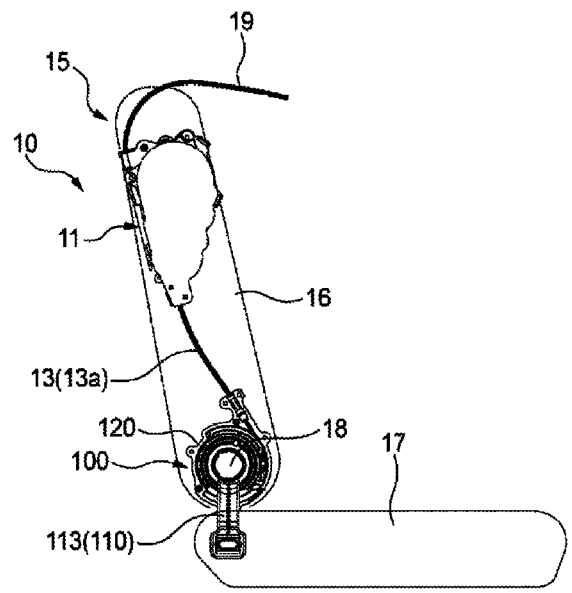
FIG. 13A is a side view illustrating the seatbelt retractor and the cable advancing/retracting mechanism with a seat back leaned rearward by 15° in a standard state.
Figure 13B:
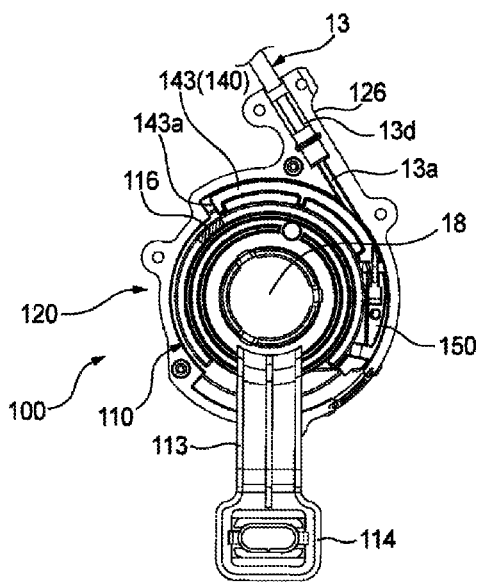
FIG. 13B is a front view illustrating the internal state of the cable advancing/retracting mechanism with the seat back leaned rearward by 15°.
Figure 14A:
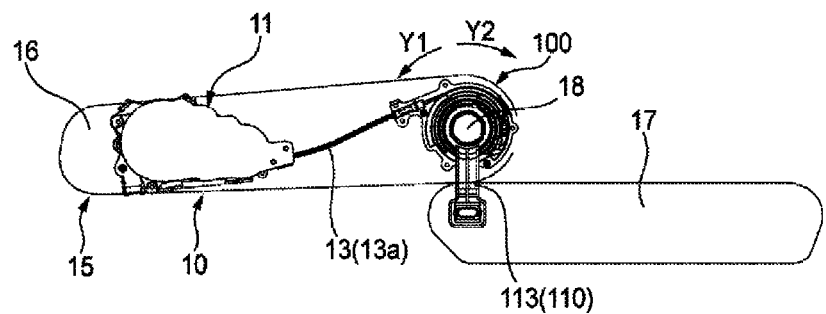
FIG. 14A is a side view illustrating the seatbelt retractor and the cable advancing/retracting mechanism with the seat back leaned rearward by 95°.
Figure 14B:
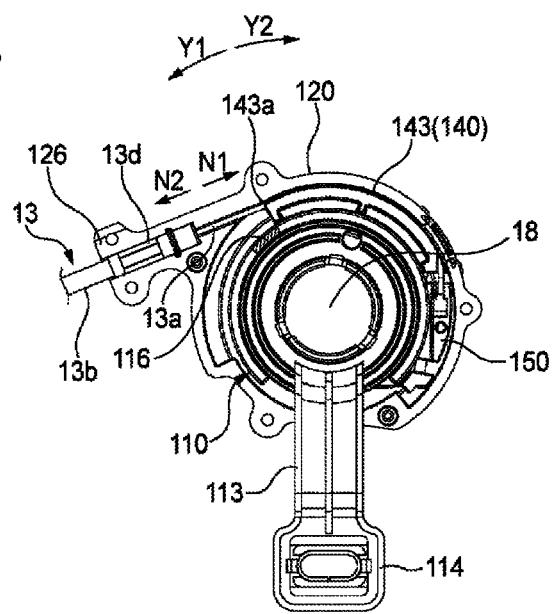
FIG. 14B is a front view illustrating the internal state of the cable advancing/retracting mechanism with the seat back leaned rearward by 95°.
Figure 15A:
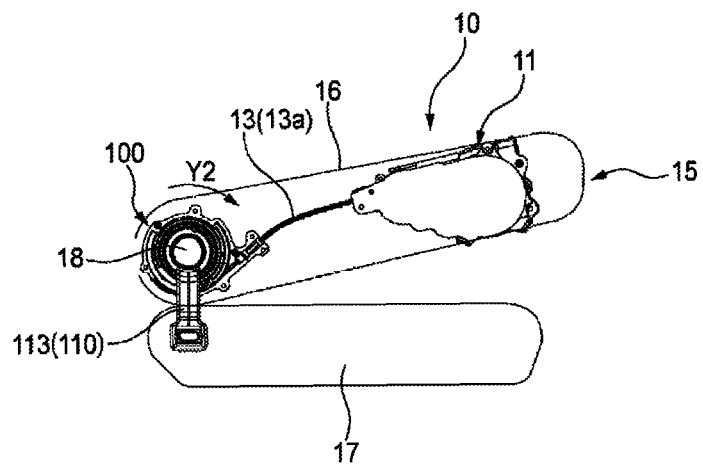
FIG. 15A is a side view illustrating the seatbelt retractor and the cable advancing/retracting mechanism with the seat back leaned forward by 75°.
Figure 15B:
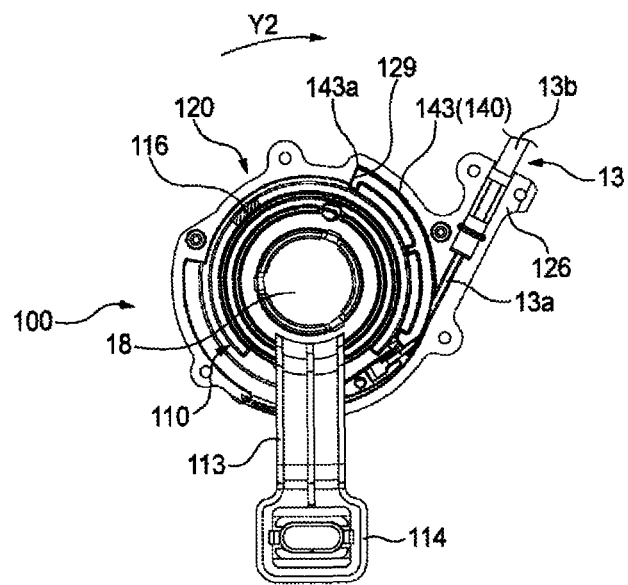
FIG. 15B is a front view illustrating the internal state of the cable advancing/retracting mechanism with the seat back leaned forward by 75°.

FIGS. 13 to 15 illustrate the state of the seatbelt retractor and the cable advancing/retracting mechanism at each tilting angle of the seat back. FIG. 13 illustrates a state with the seat back leaned rearward by 15° in a standard attitude. FIG. 14 illustrates a state with the seat back leaned rearward by 95°. FIG. 15 illustrates a state with the seat back leaned forward by 75°.

The cable advancing/retracting mechanism 100 allows the inner cable 13a to be advanced and retracted by a length corresponding to the tilting angle of the seat back 16 when the seat back 16 is tilted. For example, in the case where the seat back 16 is tilted in the direction of the arrow Y1 from the reference attitude indicated in FIG. 13 to the position indicated in FIG. 14, the one end 143a of the cam portion 143 of the cam member 140 abuts against the stopper projection 116 of the lever member 110 to make the cam member 140 immovable. However, the casing member 120 is turned together with the seat back 16, and thus the exterior tube 13b of the cable 13a is moved together with the casing member 120. This allows the terminal of the inner cable 13a to be drawn out of the exterior tube 13b. Thus, the cable 13a is subjected to draw-in operation in the direction of the arrow N1 (corresponding to wind-up operation for the cable winding groove 144 of the cam portion 143), which is transmitted to the attitude control mechanism 70.

In the case where the seat back 16 is returned from the position indicated in FIG. 14 to the position indicated in FIG. 13, conversely, the casing member 120 is rotated in the opposite direction (direction of the arrow Y2) to return the exterior tube 13b toward the terminal of the inner cable 13a. Thus, the inner cable 13a, which has been pulled by the torsion spring 75 of the attitude control mechanism 70, is returned into the exterior tube 13b. Thus, the inner cable 13a is subjected to push-out operation in the direction of the arrow N2 (corresponding to draw-out operation for the cable winding groove 144 of the cam portion 143), which is transmitted to the attitude control mechanism 70.

In the case where the seat back 16 is turned in the direction of the arrow Y2 to be folded from the position indicated in FIG. 13 to the position indicated in FIG. 15, the casing member 120 is turned together with the seat back 16. After the abutment stepped portion 129 of the casing member 120 abuts against the one end 143a of the cam portion 143 of the cam member 140, the cam member 140 is also turned together with the casing member 120. Thus, the inner cable 13a is not subjected to draw-in operation with respect to the exterior tube 13b. However, an occupant is not seated on the seat cushion 17 in the folded state, and there is no problem if the sensor housing 32 is not maintained in a horizontal state.

The effect of the embodiment will be described below.

When the reclining angle of the seat back 16 is adjusted, the inner cable 13a is advanced and retracted by a length corresponding to the reclining angle, and the pulley 73 of the attitude control mechanism 70 is rotated in accordance with the advancement and retraction of the inner cable 13a. When the pulley 73 is rotated in the same direction as the tilting direction of the seat back 16, the adjustment gear 74 is turned in the opposite direction by the same angle as the tilting angle of the pulley 73. The turning motion of the adjustment gear 74 is transmitted to the sensor housing 32 through the pin 74c and the slit 32h, and the sensor housing 32 is turned in the opposite direction by the same angle as the tilting angle of the seat back 16 to keep the inertial element support surface 33 of the sensor housing 32 generally horizontal.

In this event, as discussed above, a deviation in rotational angle is caused in accordance with the rotational angle positions of the adjustment gear 74 and the sensor housing 32, and the deviation in rotational angle is corrected with the pulley 73 rotated such that the deviation in rotational angle is compensated for by variations in radius of the cable winding groove 73b. Thus, the inclination angle of the seat back 16 and the rotational angle of the sensor housing 32 are accurately synchronized with each other. As a result, the inertial element support surface 33 of the sensor housing 32 is always kept accurately horizontal irrespective of the reclining angle of the seat back 16.

When acceleration in a horizontal direction that is larger than a predetermined value is applied to the acceleration sensor 30 because of a crash of the vehicle or the like, the ball 35, which is an inertial element placed on the inertial element support surface 33, is displaced from the neutral position. Consequently, the second sensor lever 37 is turned, and the turning motion of the second sensor lever 37 is transferred to the first sensor lever 36 to turn the first sensor lever 36. Then, the upper lug portion 36b is engaged with the engagement lugs 25a of the steering wheel 25 to restrict rotation of the steering wheel 25, which hinders the seatbelt 19 from being paid out to restrain an occupant.

Since inclination of the sensor housing 32 in the front-back direction of the vehicle is always maintained in a generally horizontal state, the acceleration sensor 30 adequately detects acceleration in each case, including a case where gentle deceleration in the vehicle advancing direction is applied and a case where a transition is made from gentle deceleration to rapid deceleration, to lock draw-out of the seatbelt 19 without causing a delay in locking the seatbelt 19.

In the seatbelt device 10, the cable length adjustment mechanism 200 of the cable advancing/retracting mechanism 100 is provided at the cam member 140 which actually detects the tilting angle of the seat back 16, and adjusts the length of the inner cable 13a drawn out of the terminal portion of the exterior tube 13b by moving with the cable adjuster 150 pulling the terminal portion of the inner cable 13a. Thus, the length of the inner cable 13a may be adjusted accurately such that no slack is caused in the inner cable 13a. Thus, the accuracy in advancing and retracting the inner cable 13a in accordance with the reclining angle of the seat back 16 is enhanced to improve the performance of the acceleration sensor 30. The cable adjuster 150 is disposed at the outer peripheral portion of the cam member 140, which may make the cable advancing/retracting mechanism 100 compact in outer shape.

With the cable advancing/retracting mechanism 100, the position of the cable adjuster 150 may be changed by a simple operation of turning the adjustment screw 160, and the length of the inner cable 13a may be adjusted such that no slack is caused in the cable 13a.

With the seatbelt device 10 according to the embodiment, as described above, a deviation in rotational angle caused between the adjustment gear 74 and the sensor housing 32 is compensated for by the compensation unit provided between the cable advancing/retracting mechanism 100 and the attitude control mechanism 70. Thus, the inclination angle of the seat back 16 and the rotational angle of the sensor housing 32 may be accurately synchronized with each other. Thus, it is possible to keep the inertial element support surface 33, which serves as the sensor reference surface, accurately horizontal even at any seat back inclination angle to improve the accuracy of the acceleration sensor 30.

With the seatbelt device 10 according to the embodiment, in particular, fluctuations in length of the inner cable 13a are accommodated as variations in rotation of the pulley 73 due to the profile of the cable winding groove 73b (compensation unit) of the pulley 73 of the attitude control mechanism 70. Thus, the present invention is easily feasible just by preparing such a pulley 73.

According to the embodiment, even if a condition for occurrence of a deviation in rotational angle between the adjustment gear 74 and the sensor housing 32 is met with the turning axis L2 of the adjustment gear 74 and the swing axis L1 of the sensor housing 32 not on an identical line, the presence of the compensation unit (profile of the cable winding groove 73b of the pulley 73) eliminates the need to provide the retractor frame 21 with a dedicated attachment portion such as a bent portion, which allows the retractor frame 21 attached as inclined to the left and right seats to be provided as a common part. Thus, commonality of the retractor frame 21, which is difficult to prepare, is achieved to contribute to a cost reduction.

The attitude control mechanism 70 further includes the adjustment gear 74 and the rotation transfer mechanism 76. The adjustment gear 74 is turned in synchronization with rotation of the pulley 73 by an angle corresponding to the distance over which the cable 13a is advanced or retracted by the cable advancing/retracting mechanism 100. The rotation transfer mechanism 76 transfers rotation of the adjustment gear 74 to the sensor housing 32 to swing the sensor housing 32 in the front-back direction of the vehicle. The sensor cover 31 is provided separately from the attitude control mechanism 70, and formed such that the turning axis L2 of the adjustment gear 74 and the swing axis L1 of the sensor housing 32 intersect each other at a predetermined angle with respect to the left-right direction of the vehicle with the swing axis L1 of the sensor housing 32 arranged in a horizontal direction with respect to the left-right direction of the vehicle. This allows the inertial element support surface 33, which serves as the sensor reference surface, to be kept horizontal even at any inclination angle of the seat back 16, which allows adequate detection of acceleration.

According to the embodiment, different parts for the right and left seats are provided for the sensor housing 32, the sensor cover 31, the pulley 73, and so forth, and commonality is achieved for the remaining parts. Thus, commonality of constituent parts is achieved even for the seatbelt retractor which is attached in different attitudes between the right seat and the left seat.

The present invention is not limited to the embodiment discussed above, and may be modified, improved, etc. as appropriate. Besides, the material, shape, dimension, number, location, etc. of the constituent elements in the embodiment discussed above may be determined as desired as long as the present invention is achieved, and are not limited.

For example, in the seatbelt device according to the embodiment described above, the cable winding groove 73b of the pulley 73 of the attitude control mechanism 70 has a spline curve profile to constitute a compensation unit. However, the cable winding groove 144 of the cam member 140 of the cable advancing/retracting mechanism 100 may have a spline curve profile to constitute a compensation unit.

That is, the winding radius of the cable 13a is set so as to be varied in accordance with the rotational angle of the cam member 140 by forming the cable winding groove 144 of the cam member 140 of the cable advancing/retracting mechanism 100 in a spline curve shape. This allows a deviation in rotational angle between the adjustment gear 74 and the sensor housing 32 to be compensated for. In this case, the cable winding groove 73b of the pulley 73 of the attitude control mechanism 70 has a perfect circle profile rather than a spline curve profile.

In another embodiment, for the compensation unit configured to compensate for a deviation in rotational angle between the adjustment gear 74 and the sensor housing 32, the same effect is achieved if a support shaft for the pulley 73 of the attitude control mechanism 70, that is, the support shaft 71c of the first pulley case 71 which supports the pulley 73 in the embodiment, has a spline curve profile.

In the embodiment described above, the adjustment gear 74 is meshed with the gear 73a of the pulley 73 of the attitude control mechanism 70 so that rotation of the adjustment gear 74, which serves as a rotary member, is transferred to the sensor housing 32 through a combination of the pin 74c and the slit 32h. However, the pulley 73 itself may constitute a rotary member.

That is, the pulley 73 of the attitude control mechanism 70 may be rotated in the direction opposite to the rotational direction of the seat back 16 if the direction of winding the inner cable 13a around the pulley 73 is set to the opposite to that in the embodiment described above. Thus, the sensor housing 32 may be turned in the direction opposite to the rotational direction of the seat back 16 by providing the pulley 73 with a pin to be engaged with the slit 32h of the sensor housing 32.

Also in this case, the rotational track surface of the pulley 73 and the rotational track surface of the sensor housing 32 are non-parallel with each other, and a compensation unit is provided between the cable advancing/retracting mechanism 100 and the attitude control mechanism 70. The compensation unit is configured to compensate for a deviation in rotational angle caused by such non-parallelism between the two rotational track surfaces when rotation is transmitted from the pulley 73 to the sensor housing 32.

Besides, the cable advancing/retracting mechanism 100 may be of a rack and pinion type, for example.

In the embodiment described above, the adjustment screw 160 is used in the cable adjuster moving unit 201 of the cable advancing/retracting mechanism 100. However, the cable adjuster moving unit 201 may include a spring configured to urge the cable adjuster 150 in the direction of drawing the inner cable 13a out of the terminal portion of the exterior tube 13b. In the case where a compression coil spring is used, for example, the compression coil spring may be interposed between the cable adjuster 150 and the other end 143b of the cam portion 143 to urge the cable adjuster 150 in the direction of moving away from the other end 143b of the cam portion 143. When such a spring is used, the cable adjuster 150 may be moved by the urging force of the spring to adjust the length of the cable 13a such that no slack is caused in the cable 13a.

The present invention is based on Japanese Patent Application No. 2011-248981 filed on Nov. 14, 2011, Japanese Patent Application No. 2011-248982 filed on Nov. 14, 2011, and Japanese Patent Application No. 2011-273694 filed on Dec. 14, 2011, the contents of which are incorporated herein by reference.

What is claimed is:

1. A seatbelt device for a reclining seat of a vehicle, the seatbelt device comprising:
   a seatbelt retractor attached to a seat back of the reclining seat and configured to wind up a seatbelt when necessary; and
   a cable advancing/retracting mechanism disposed at a coupling portion at which the seat back and a seat cushion of the reclining seat are coupled to each other and configured to detect an inclination angle of the seat back when the seat back is tilted in a front-back direction of a vehicle, the cable advancing/retracting mechanism including a cable configured to transmit the inclination angle to the seatbelt retractor and advance and retract in a longitudinal direction of the cable over a distance corresponding to the inclination angle of the seat back,
   the seatbelt retractor including:
      a retractor frame fixed to the seat back as inclined in a left-right direction of the vehicle with respect to a line extending in an up-down direction at a center of the seat back in the left-right direction;
      a spindle supported by the retractor frame and configured to wind up the seatbelt;
      an acceleration sensor attached to the retractor frame to detect acceleration in the front-back direction of the vehicle;
      a lock mechanism configured to lock draw-out operation for the seatbelt in accordance with the acceleration in the front-back direction of the vehicle detected by the acceleration sensor; and
      an attitude control mechanism configured to keep a sensor reference surface of the acceleration sensor horizontal,
   the acceleration sensor including:
      a sensor cover fixed to the retractor frame;
      an inertial element configured to be moved in the front-back direction of the vehicle when acceleration that is equal to or more than a predetermined value is applied in the front-back direction of the vehicle;
      a sensor housing supported on the sensor cover and having a swing axis extending along the left-right direction of the vehicle and an inertial element support surface on which the inertial element is placed; and
      an actuation member configured to actuate the lock mechanism to lock the draw-out operation in conjunction with movement of the inertial element in the front-back direction of the vehicle, and
   the attitude control mechanism including:
      a rotary member configured to be turned by an angle corresponding to a distance over which the cable is advanced or retracted by the cable advancing/retracting mechanism; and
      a rotation transfer mechanism configured to transfer rotation of the rotary member to the sensor housing to swing the sensor housing in the front-back direction of the vehicle, wherein
   a turning axis of the rotary member and the swing axis of the sensor housing intersect each other at a predetermined angle with respect to the left-right direction of the vehicle with the swing axis of the sensor housing arranged in a horizontal direction with respect to the left-right direction of the vehicle,
   the inertial element support surface of the sensor housing is kept horizontal by swing motion of the sensor housing in the front-back direction of the vehicle even if the seat back is tilted in the front-back direction of the vehicle,
   a rotational track surface of the rotary member and a rotational track surface of the sensor housing are non-parallel with each other, and
   a compensation unit is provided between the cable advancing/retracting mechanism and the attitude control mechanism, the compensation unit being configured to compensate for a deviation in rotational angle caused by such non-parallelism between the two rotational track surfaces when the rotation transfer mechanism transmits rotation from the rotary member to the sensor housing.

2. The seatbelt device according to claim 1, wherein
   the attitude control mechanism includes a pulley configured to convert advancing and retracting motion of the cable into rotational motion to transmit rotation to the rotary member, and a winding radius of the cable is set so as to be varied in accordance with a rotational angle of the pulley by forming a cable winding portion of the pulley in a spline curve shape, and
   the compensation unit is constituted by the cable winding portion of the pulley formed in the spline curve shape.

3. The seatbelt device according to claim 1, wherein
   the cable advancing/retracting mechanism includes a cam member configured to allow the cable to be wound and pulled out in accordance with rotation to advance and retract the cable over a distance corresponding to the inclination angle of the seat back, and a winding radius of the cable is set so as to be varied in accordance with a rotational angle of the cam member by forming a cable winding portion of the cam member in a spline curve shape, and
   the compensation unit is constituted by the cable winding portion of the cam member formed in the spline curve shape.

4. The seatbelt device according to claim 1, wherein
   the rotation transfer mechanism includes a pin and a slit provided on the rotary member and in the sensor housing, respectively, and disposed at positions away from the swing axis and the turning axis in a radial direction to be engaged with each other.

5. A seatbelt device for a reclining seat of a vehicle, the seatbelt device comprising:
   a seatbelt retractor attached to a seat back of the reclining seat and configured to wind up a seatbelt when necessary; and
   a cable advancing/retracting mechanism disposed at a coupling portion at which the seat back and a seat cushion of the reclining seat are coupled to each other and configured to detect an inclination angle of the seat back when the seat back is tilted in a front-back direction of a vehicle, the cable advancing/retracting mechanism including a cable configured to transmit the inclination angle to the seatbelt retractor and advance and retract in a longitudinal direction of the cable over a distance corresponding to the inclination angle of the seat back,
   the seatbelt retractor including:
      a retractor frame fixed to the seat back as inclined in a left-right direction of the vehicle with respect to a line extending in an up-down direction at a center of the seat back in the left-right direction;
      a spindle supported by the retractor frame and configured to wind up the seatbelt;

an acceleration sensor attached to the retractor frame to detect acceleration in the front-back direction of the vehicle;

a lock mechanism configured to lock draw-out operation for the seatbelt in accordance with the acceleration in the front-back direction of the vehicle detected by the acceleration sensor; and an attitude control mechanism configured to keep a sensor reference surface of the acceleration sensor horizontal, and the acceleration sensor including:

a sensor cover fixed to the retractor frame;

an inertial element configured to be moved in the front-back direction of the vehicle when acceleration that is equal to or more than a predetermined value is applied in the front-back direction of the vehicle;

a sensor housing supported on the sensor cover and having a swing axis extending along the left-right direction of the vehicle and an inertial element support surface on which the inertial element is placed; and an actuation member configured to actuate the lock mechanism to lock the draw-out operation in conjunction with movement of the inertial element in the front-back direction of the vehicle, wherein the attitude control mechanism includes a pulley configured to convert advancing and retracting motion of the cable of the cable advancing/retracting mechanism into rotational motion, and a rotational track surface of the pulley and a rotational track surface of the sensor housing are non-parallel with each other, and a compensation unit is provided between the cable advancing/retracting mechanism and the attitude control mechanism, the compensation unit being configured to compensate for a deviation in rotational angle caused by such non-parallelism between the two rotational track surfaces when rotation is transmitted from the pulley to the sensor housing.

6. The seatbelt device according to claim 5, wherein a winding radius of the cable is set so as to be varied in accordance with a rotational angle of the pulley by forming a cable winding portion of the pulley in a spline curve shape, and the compensation unit is constituted by the cable winding portion of the pulley formed in the spline curve shape.

7. The seatbelt device according to claim 5, wherein the cable advancing/retracting mechanism includes a cam member configured to allow the cable to be wound and pulled out in accordance with rotation to advance and retract the cable over a distance corresponding to the inclination angle of the seat back, and a winding radius of the cable is set so as to be varied in accordance with a rotational angle of the cam member by forming a cable winding portion of the cam member in a spline curve shape, and the compensation unit is constituted by the cable winding portion of the cam member formed in the spline curve shape.

8. The seatbelt device according to claim 5, wherein the attitude control mechanism further includes a rotary member configured to be turned by an angle corresponding to a distance over which the cable is advanced or retracted by the cable advancing/retracting mechanism in synchronization with rotation of the pulley, and a rotation transfer mechanism configured to transfer rotation of the rotary member to the sensor housing to swing the sensor housing in the front-back direction of the vehicle, the sensor cover is provided separately from the attitude control mechanism, and the sensor cover is formed such that a turning axis of the rotary member and the swing axis of the sensor housing intersect each other at a predetermined angle with respect to the left-right direction of the vehicle with the swing axis of the sensor housing arranged in a horizontal direction with respect to the left-right direction of the vehicle.

9. The seatbelt device according to claim 8, wherein the rotation transfer mechanism includes a pin and a slit provided on the rotary member and in the sensor housing, respectively, and disposed at positions away from the swing axis and the turning axis in a radial direction to be engaged with each other.

10. The seatbelt device according to claim 5, wherein the cable advancing/retracting mechanism includes a lever member fixed to the seat cushion, a casing member disposed coaxially with a center of turning motion of the seat back so as to be turnable with respect to the lever member, the casing member being fixed to the seat back to be turned as the seat back is tilted, and a cam member provided coaxially with the center of turning motion of the seat back so as to be turnable with respect to the lever member and the casing member, the cam member being hindered from moving by the lever member when the casing member is turned as the seat back is tilted while the inclination angle of the seat back is in a predetermined range, the casing member includes an exterior tube terminal fixing portion for fixation of a terminal portion of an exterior tube configured to slidably hold the cable, the cam member includes a cable winding groove which is formed along an outer peripheral surface of the cam member and in which the cable drawn out of the terminal portion of the exterior tube is wound, and the cam member is provided with a cable length adjustment mechanism including a cable adjuster and a cable adjuster moving unit, the cable adjuster including a cable terminal fixing portion for fixation of the terminal portion of the cable wound in the cable winding groove and mounted so as to be linearly slidable at an outer peripheral portion of the cam member, and the cable adjuster moving unit being configured to slide the cable adjuster to adjust a length of the cable drawn out of the terminal portion of the exterior tube.

11. The seatbelt device according to claim 10, wherein the cable adjuster moving unit includes a screw receiving wall formed on the cam member, a screw insertion hole formed to penetrate the screw receiving wall, a screw hole formed in an end surface of the cable adjuster in a slide direction, and an adjustment screw screwed into the screw hole of the cable adjuster with a head portion received by the screw receiving wall and with a distal end side of a screw shaft portion inserted through the screw insertion hole, and the cable adjuster is displaced via the adjustment screw by rotating the adjustment screw.

12. The seatbelt device according to claim 10, wherein the cable adjuster moving unit includes a spring configured to urge the cable adjuster in a direction of drawing the cable out of the terminal portion of the exterior tube.

13. The seatbelt device according to claim 10, wherein the lever member, the casing member, and the cam member are provided with respective positioning holes configured to penetrate the three members when the members are aligned with each other.

14. The seatbelt device according to claim 10, wherein the cable adjuster is mounted at the outer peripheral portion of the cam member so as to be slidable in a direction of a tangent to a circle centered about the center of turning motion of the seat back.

15. A seatbelt device for a reclining seat of a vehicle, the seatbelt device comprising:
- a seatbelt retractor attached to a seat back of the reclining seat and configured to wind up a seatbelt when necessary; and
- a cable advancing/retracting mechanism including a cable configured to transmit an inclination angle between the seat back and seat cushion to the seatbelt retractor and to advance and retract the cable over a distance corresponding to the inclination angle of the seat back,
- the seatbelt retractor including an acceleration sensor attached to a retractor frame to detect acceleration in a front-back direction of the vehicle, a lock mechanism configured to lock draw-out operation for the seatbelt in accordance with the acceleration in the front-back direction of the vehicle detected by the acceleration sensor, and an attitude control mechanism configured to keep a sensor reference surface of the acceleration sensor horizontal, the acceleration sensor including an inertial element configured to be moved in the front-back direction of the vehicle when acceleration that is equal to or more than a predetermined value is applied in the front-back direction of the vehicle, the attitude control mechanism including a rotary member configured to be turned by an angle corresponding to a distance over which the cable is advanced or retracted; and
- a compensation unit provided between the cable advancing/retracting mechanism and the attitude control mechanism, the compensation unit being configured to compensate for a deviation in rotational angle caused by non-parallelism between a rotational axis of the rotary member and a rotational axis of the acceleration sensor, the rotational axis of the acceleration sensor permitting rotation in the front-back direction of the vehicle;
- wherein the rotary member is a pulley, the pulley defining a cable winding portion that receives the cable, the cable winding portion defining a non-constant radius of curvature which constitutes the compensation unit.

16. The seatbelt device according to claim 15, wherein the pulley is coupled to the cable such that the pulley is rotated about the rotational axis of the pulley in an amount corresponding to the distance over which the cable is advanced or retracted.

17. The seatbelt device according to claim 16, wherein the pulley defines a cable winding portion that receives the cable, the cable winding portion defining a spline curve shape which constitutes the compensation unit.

18. The seatbelt device according to claim 15, further comprising a rotation transfer mechanism coupled to the rotary member so as to transfer rotation in the front-back direction of the vehicle to the acceleration sensor, the rotary transfer member including a rotary part coupled to the rotary member and a sensor part coupled to the acceleration sensor, the rotary part being moveable relative to the sensor part.

19. The seatbelt device according to claim 18, wherein the rotary part and the sensor part are one of a pin and a slit.

* * * * *